(12) United States Patent
Li et al.

(10) Patent No.: US 10,613,687 B2
(45) Date of Patent: Apr. 7, 2020

(54) INFORMATION PROCESSING METHOD AND ELECTRONIC DEVICE

(71) Applicants: Beijing Lenovo Software LTD., Beijing (CN); Lenovo (Beijing) Limited, Beijing (CN)

(72) Inventors: Bin Li, Beijing (CN); Sheng Wang, Beijing (CN); Ziyan Sun, Beijing (CN); Zhen Tang, Beijing (CN)

(73) Assignees: BEIJING LENOVO SOFTWARE LTD., Beijing (CN); LENOVO (BEIJING) LIMITED, Beijing (CN)

( * ) Notice: Subject to any disclaimer, the term of this patent is extended or adjusted under 35 U.S.C. 154(b) by 1153 days.

(21) Appl. No.: 14/230,704

(22) Filed: Mar. 31, 2014

(65) Prior Publication Data
US 2015/0199305 A1    Jul. 16, 2015

(30) Foreign Application Priority Data

Jan. 13, 2014 (CN) .......................... 2014 1 0014374
Jan. 27, 2014 (CN) .......................... 2014 1 0040216

(51) Int. Cl.
G06F 17/21 (2006.01)
G06F 3/042 (2006.01)
G06F 3/043 (2006.01)

(52) U.S. Cl.
CPC .............. G06F 3/042 (2013.01); G06F 3/043 (2013.01)

(58) Field of Classification Search
CPC .......... G06F 21/32; G06F 3/042; G06F 3/043; G06K 9/00885

(Continued)

(56) References Cited

U.S. PATENT DOCUMENTS 6,483,929 B1 * 11/2002 Murakami ......... G06K 9/00496
340/5.83
6,961,448 B2 * 11/2005 Nichols ................ A61B 5/1171
382/115

(Continued)

FOREIGN PATENT DOCUMENTS

CN    101286201 A    10/2008
CN    102014237 A    4/2011

(Continued)

OTHER PUBLICATIONS

Fitzpatrick et al., "Real Time Person Tracking and Identification using the Kinect Sensor," 2013.*

(Continued)

*Primary Examiner* — Maikhanh Nguyen
(74) *Attorney, Agent, or Firm* — Westman, Champlin & Koehler, P.A.

(57) ABSTRACT

The present disclosure discloses an information processing method comprising steps of: obtaining a current first characteristic parameter of a first user by a first collection unit; determining a first position and identification information of the first user by utilizing the first characteristic parameter; obtaining a corresponding first user file according to the identification information and determining a first displaying position according to the first position; and displaying the first user file at the first displaying position. By using characteristic parameter of a user, a file corresponding to the user and a position to display the file can be determined. The file is then displayed at the determined position. A file which conforms to the user's status is automatically displayed at a corresponding position, thereby providing a more convenient environment for users and to improve the user experience.

12 Claims, 11 Drawing Sheets

(58) Field of Classification Search
USPC ........................................................ 715/273
See application file for complete search history.

(56) References Cited

U.S. PATENT DOCUMENTS

| | | | | |
|---|---|---|---|---|
| 7,171,680 | B2* | 1/2007 | Lange | A61B 5/04525 |
| | | | | 726/5 |
| 7,358,515 | B2* | 4/2008 | Setlak | G06K 9/00013 |
| | | | | 250/208.1 |
| 7,689,833 | B2* | 3/2010 | Lange | A61B 5/04525 |
| | | | | 713/186 |
| 9,053,308 | B2* | 6/2015 | Lange | G06K 9/00892 |
| 2002/0138768 | A1* | 9/2002 | Murakami | G06K 9/00 |
| | | | | 726/5 |
| 2003/0023855 | A1* | 1/2003 | Keogh | E05B 65/0075 |
| | | | | 713/186 |
| 2003/0128867 | A1* | 7/2003 | Bennett | G06K 9/00 |
| | | | | 382/115 |
| 2003/0135097 | A1* | 7/2003 | Wiederhold | A61B 5/02055 |
| | | | | 600/301 |
| 2004/0036574 | A1* | 2/2004 | Bostrom | G06K 9/00973 |
| | | | | 340/5.82 |
| 2005/0182673 | A1* | 8/2005 | Marzian | G06Q 30/02 |
| | | | | 705/7.29 |
| 2006/0136744 | A1* | 6/2006 | Lange | G06K 9/00536 |
| | | | | 713/186 |
| 2006/0204048 | A1* | 9/2006 | Morrison | G06F 21/31 |
| | | | | 382/115 |
| 2007/0290124 | A1* | 12/2007 | Neil | G06K 9/00013 |
| | | | | 250/221 |
| 2010/0158327 | A1* | 6/2010 | Kangas | G06F 21/316 |
| | | | | 382/124 |
| 2010/0179394 | A1* | 7/2010 | Sohn | A61B 5/00 |
| | | | | 600/301 |
| 2011/0058713 | A1* | 3/2011 | Kogane | G06K 9/00308 |
| | | | | 382/118 |
| 2011/0314285 | A1* | 12/2011 | Hirata | G06F 21/32 |
| | | | | 713/170 |
| 2014/0165185 | A1* | 6/2014 | Lange | G06F 21/32 |
| | | | | 726/19 |
| 2014/0347160 | A1* | 11/2014 | Chen | G07C 9/00158 |
| | | | | 340/5.53 |
| 2015/0073998 | A1* | 3/2015 | Alsina | G06Q 20/32 |
| | | | | 705/75 |

FOREIGN PATENT DOCUMENTS

| | | |
|---|---|---|
| CN | 102446096 A | 5/2012 |
| CN | 102902354 A | 1/2013 |
| CN | 102982064 A | 3/2013 |
| CN | 103049084 A | 4/2013 |
| CN | 103186326 A | 7/2013 |
| CN | 103279260 A | 9/2013 |
| CN | 103365869 A | 10/2013 |
| KR | 20130093757 A | 8/2013 |

OTHER PUBLICATIONS

First Office Action from Chinese Patent Application No. 201410014374.9, dated Jun. 29, 2017, 7 pages.
First Office Action from Chinese Patent Application No. 201410040216.0, dated May 19, 2017, 8 pages.
Second Office Action for Chinese Patent Application No. 201410040216.0, dated Jan. 15, 2018, 7 pages.

* cited by examiner

INFORMATION PROCESSING METHOD AND ELECTRONIC DEVICE

CROSS-REFERENCE TO RELATED APPLICATION

This Application is a non-provisional Application of Chinese Application Nos. CN 201410014374.9, filed Jan. 13, 2014 and CN 201410040216.0, filed Jan. 13, 2014, in Chinese, the contents of which are hereby incorporated by reference in their entirety.

TECHNICAL FIELD

The present disclosure generally relates to the wireless communication field, and more particularly, to an information processing method and an electronic device.

BACKGROUND

With the increasing popularization of the device with a large screen, more and more users will utilize the device with a large screen. However, when the device with a large screen is utilized, the user usually can' utilize all of the touch and display area of the device since the operation range of the screen is large enough. Thus, it is necessary for the user to display a file selected by the user at a corresponding displaying position for the user's operation. In turn, it is necessary for the user to manually operate to select the file and to select the displaying position. When it is impossible for the user to reach the displayed position of the file, there will be a problem in which the user can't operate the file.

SUMMARY

In light of this, it is an object of the present invention to provide an information processing method and an electronic device, so as to provide users with a convenient environment and improve the user experience.

In order to achieve the above object, the embodiments of the present invention provide the following solutions.

The present disclosure provides an information processing method for use in an electronic device including a first collection unit and a touch display unit. When the first collection unit is in an operating state to collect a first characteristic parameter of at least one user in real time, the method comprises steps of: obtaining a current first characteristic parameter of a first user collected by the first collection unit; judging whether the first characteristic parameter satisfies a predefined first condition, and generating first response information if the first condition is satisfied; determining a first position of the first user and identification information of the first user by utilizing the first characteristic parameter according to the first response information; obtaining a corresponding first user file according to the identification information of the first user and determining a first displaying position according to the first position of the first user; generating a first instruction by utilizing the first user file and the first displaying position; and displaying the first user file at the first displaying position by the touch display unit according to the first instruction.

The present disclosure provides an information processing method for use in an electronic device including a first collection unit and a touch display unit. When the first collection unit is in an operating state and the touch display unit displays a first user file at a first displaying position, the method comprises steps of: obtaining a current first characteristic parameter of a first user collected by the first collection unit; judging whether the first characteristic parameter satisfies a predefined first condition, and generating a third instruction if the first condition is not satisfied; resolving the third instruction by the touch display unit to obtain a third resolution result and closing the first user file according to the third resolution result.

The present disclosure provides an electronic device, including a first collection unit, a touch display unit and an information processing unit, wherein the first collection unit is configured to collection a first characteristic parameter of at least one user in real time in an operating state, and to transmit the first characteristic parameter to the information processing unit; the information processing unit is configured to obtain a current first characteristic parameter of a first user collected by the first collection unit, to judge whether the first characteristic parameter satisfies a predefined first condition and to generate first response information if the first condition is satisfied, to determine a first position of the first user and identification information of the first user by utilizing the first characteristic parameter according to the first response information, to obtain a corresponding first user file according to the identification information of the first user and to determine a first displaying position according to the first position of the first user, to generate a first instruction by utilizing the first user file and the first displaying position and to transmit the first instruction to the touch display unit; and the touch display unit is configured to display the first user file at the first displaying position according to the first instruction.

The present disclosure provides an electronic device, including a first collection unit, a touch display unit and an information processing unit, wherein the first collection unit is configured to collect the current first characteristic parameter of a first user; the information processing unit is configured to obtain a current first characteristic parameter of a first user collected by the first collection unit when the first collection unit is in an operating state and the touch display unit displays a first user file at a first displaying position, to judge whether the first characteristic parameter satisfies a predefined first condition, to generate a third instruction if the first condition is not satisfied and to transmit the third instruction to the touch display unit; and the touch display unit is configured to resolve the third instruction to obtain a third resolution result and to close the first user file according to the third resolution result.

The information processing method and the electronic device provided by the present disclosure may automatically select corresponding files for the user if the first characteristic parameter satisfies the first condition and may display it at a corresponding position. Thus, it may automatically select and display a file which conforms to the user's status and position so as to provide a more convenient environment for users and to improve the user experience.

DETAILED DESCRIPTION

The present disclosure will be further illustrated in detail by referring to the accompany figures and the particular embodiments.

1$^{st}$ Embodiment

Figure 1:
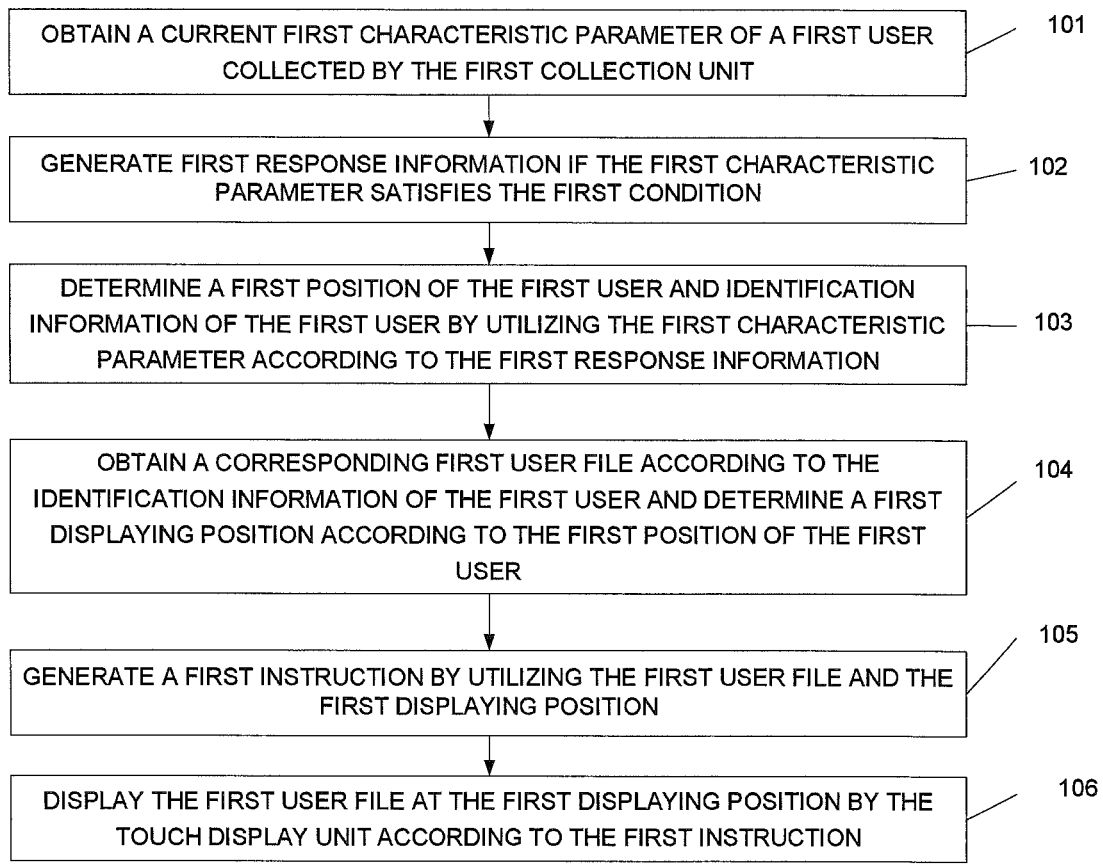
FIG. 1 is a first flowchart schematically showing an information processing method according to one embodiment of the present disclosure.

The embodiment of the present disclosure provides an information processing method for use in an electronic device which may be a device with a large screen and includes a first collection unit and a touch display unit. When the first collection unit is in an operating state to collect a first characteristic parameter of at least one user in real time, as shown in FIG. 1, the method may comprise: step 101 of obtaining a current first characteristic parameter of a first user collected by the first collection unit; step 102 of judging whether the first characteristic parameter satisfies a predefined first condition, and generating first response information if the first condition is satisfied; step 103 of determining a first position of the first user and identification information of the first user by utilizing the first characteristic parameter according to the first response information; step 104 of obtaining a corresponding first user file according to the identification information of the first user and determining a first displaying position according to the first position of the first user; step 105 of generating a first instruction by utilizing the first user file and the first displaying position; and step 106 of displaying the first user file at the first displaying position by the touch display unit according to the first instruction.

Here, the first collection unit may comprise a microphone array, and/or fisheye lens, and/or WOFV lens.

Among others, the microphone array is well known, and a microphone array may be formed by installing a plurality of microphones in the electronic device.

The fisheye lens or WFOV lens is also well known. The shooting range of a fisheye lens may be 220 or 230 degrees, so all of the views surrounding the electronic device may be collected by at most two fisheye lenses.

Figure 2:
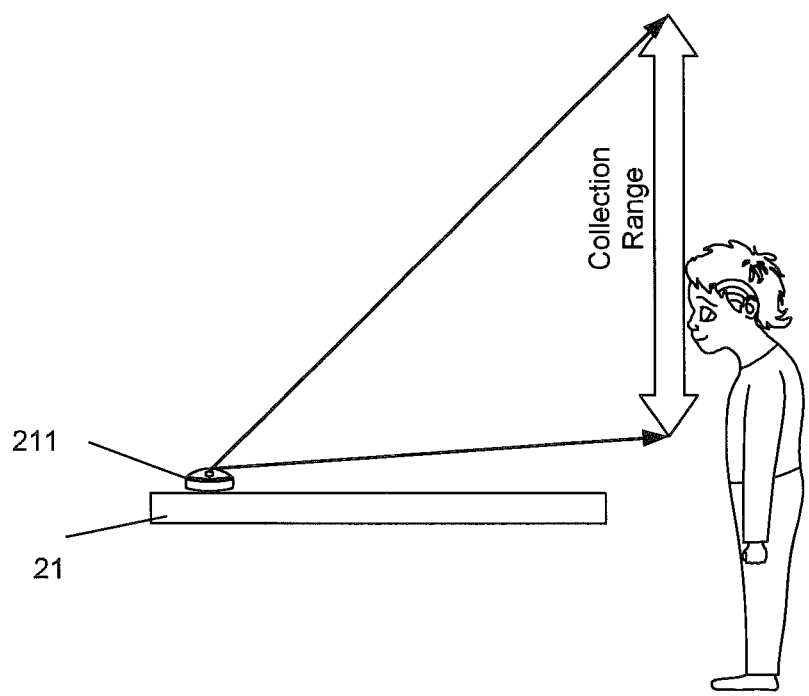
FIG. 2 is the first usage scene according to an embodiment of the present disclosure.

For example, as shown in FIG. 2, a fisheye lens or WFOV lens 211 is utilized to collect characteristic parameters of a surrounding users face. The fisheye lens or WFOV lens 211 is placed at one side of the electronic device 21 and its collection range is shown in the figure. It may collect facial characteristic parameter of the user and obtain a distance and an orientation between the WFOV lens and the user.

Figure 3:
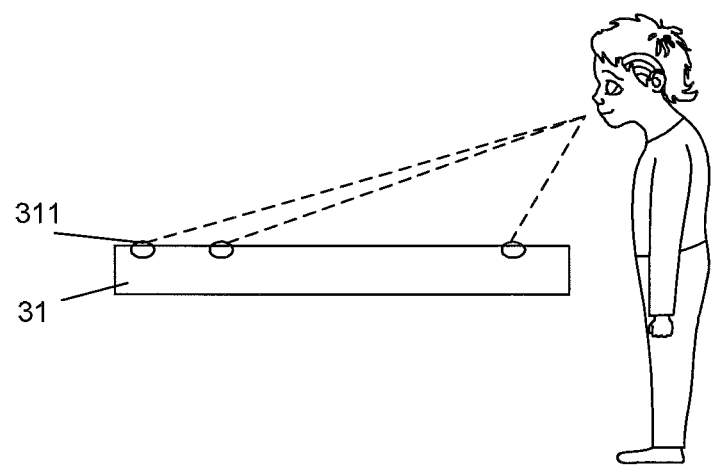
FIG. 3 is the second usage scene according to an embodiment of the present disclosure.
Figure 4:
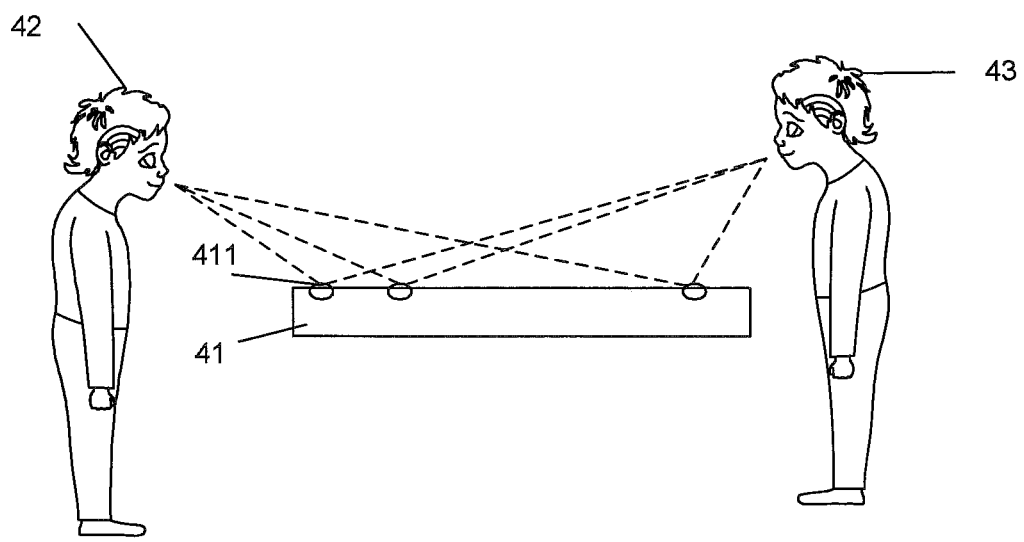
FIG. 4 is the third usage scene according to an embodiment of the present disclosure.

As shown in FIG. 3, when N microphones 311 are installed an the electronic device 31 to form a microphone array, if a user makes a sound, all of the N microphones 311 collect sound waves of the sound from the user, and a volume of the user's sound, an orientation of the sound and a voiceprint characteristic parameter are determined according to the sound wave collected by the respective microphones and the direction of the sound wave. It should be noted that a position identification for the sound may be implemented according a phase difference of the sound. The microphone array utilized in the embodiment of the present disclosure is well known, and will not be illustrated in detail. Preferably, as shown in FIG. 4, when the N microphones 411 in the electronic device 41 are utilized to form a microphone array, if there are a plurality of users beside the electronic device 41, the first user 41 and the second user 42 as shown in the figure, the microphone array may collect sound waves from the users respectively and classify the collected sound waves according to the voiceprint characteristic parameter to obtain characteristic parameters of the first user 41 and the second user 42. Its particular implementation is omitted for clarity.

When the first collection unit is a microphone array, the first characteristic parameter of the first user may be a sound parameter. The sound parameter may comprise a volume, a phase difference, an orientation of the sound or a voiceprint characteristic parameter.

When the first collection unit is a fisheye lens or a WFOV lens, the first characteristic parameter of the first user may comprise a facial characteristic parameter. The facial characteristic parameter may comprise a distance parameter and a facial image, or may comprise a distance parameter and an eye image, and so on.

The step of determining whether the first characteristic parameter satisfies the predefined first condition may comprise steps of: determining a distance from the first user to the first collection unit according to the sound parameter or the facial characteristic parameter; judging whether the distance from the first user to the first collection unit is smaller than a specified distance; deciding that the first characteristic parameter satisfies the predefined first condition if the distance is smaller than the specified distance; and deciding that the first characteristic parameter does not satisfy the predefined first condition if the distance is not smaller than the specified distance.

The step of determining a distance from the first user to the first collection unit according to the sound parameter or the facial characteristic parameter may comprise steps of: utilizing the volume or the phase difference of the sound parameters to calculate the distance from the first user to the first collection unit if the first parameter is a sound parameter; or utilizing the distance parameter as the distance from the first user to the first collection unit if the first characteristic parameter is a facial characteristic parameter.

Preferably, the step of determining a first position of the first user and identification information of the first user by utilizing the first characteristic parameter may comprise steps of: when the first characteristic parameter is a sound parameter, taking the orientation parameter of the sound parameter as the first position of the first user, and extracting a voiceprint characteristic parameter from the sound parameters and comparing the voiceprint characteristic parameter with a voiceprint characteristic parameter in a stored user voiceprint characteristic table to extract identification information corresponding to the first user, wherein the user voiceprint characteristic table may comprise user identification information and a corresponding voiceprint characteristic parameter; or when the first characteristic parameter is a facial characteristic parameter, taking the orientation parameter of the facial characteristic parameter as the first position of the first user, extracting a facial characteristic value or an eye characteristic value from the facial characteristic parameters and comparing it with a facial characteristic value or an eye characteristic value in a stored user characteristic table to extract identification information corresponding to the first user.

According to the technical solution of the embodiment of the present disclosure, it automatically selects a corresponding file for the user and displays it at an appropriate position when the users first characteristic parameter satisfies the first condition. Consequently, it may automatically select and display a file which conforms to the users status and position so as to provide a more convenient environment for users and to improve the user experience.

2$^{nd}$ Embodiment

Figure 5:
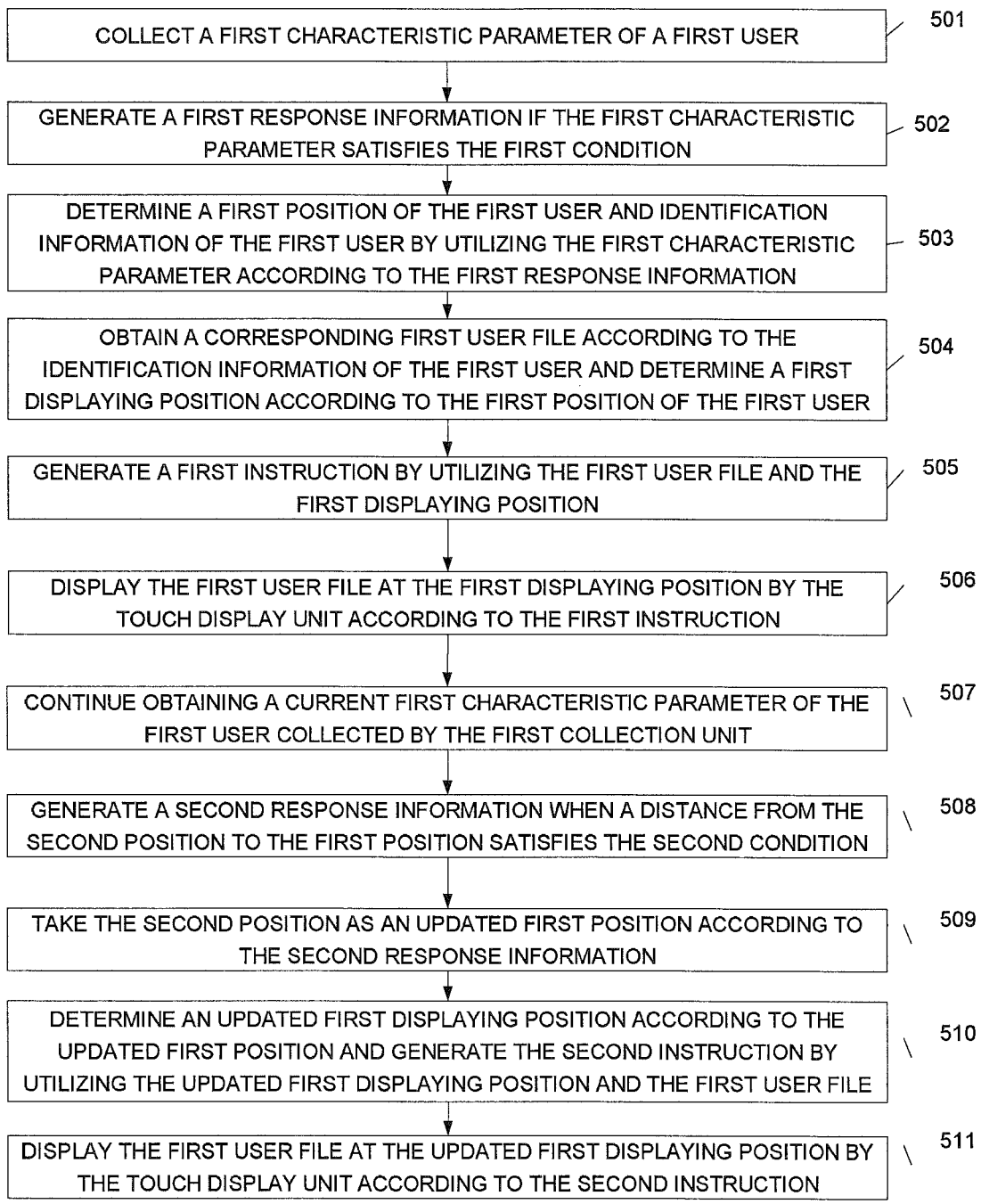
FIG. 5 is a second flowchart schematically showing an information processing method according to one embodiment of the present disclosure.

The embodiment of the present disclosure provides an information processing method for use in an electronic device which may be a device with a large screen and includes a first collection unit and a touch display unit. When the first collection unit is in an operating state to collect a first characteristic parameter of at least one user in real time, as shown in FIG. 5, the method may comprise: step 501 of obtaining a current first characteristic parameter of a first user collected by the first collection unit; step 502 of judging whether the first characteristic parameter satisfies a predefined first condition, and generating first response information if the first condition is satisfied; step 503 of determining a first position of the first user and identification information of the first user by utilizing the first characteristic parameter; step 504 of obtaining a corresponding first user file according to the identification information of the first user and determining a first displaying position according to the first position of the first user; step 505 of generating a first instruction by utilizing the first user file and the first displaying position; step 506 of displaying the first user file at the first displaying position by the touch display unit according to the first instruction; step 507 of continuing obtaining a current first characteristic parameter of the first user collected by the first collection unit; step 508 of determining a second position of the first user according to the first characteristic parameter when the first characteristic parameter satisfies the first condition, judging whether the distance from the second position to the first position satisfies a second condition, and generating second response information when the second condition is satisfied; step 509 of taking the second position as an updated first position according to the second response information; step 510 of determining an updated first displaying position according to the updated first position and generating the second instruction by utilizing the updated first displaying position and the first user file; and step 511 of displaying the first user file at the updated first displaying position by the touch display unit according to the second instruction.

Here, the first collection unit may comprise a microphone array, and/or fisheye lens, and/or WOFV lens.

Among others, the microphone array is well known, and a microphone array may be formed by installing a plurality of microphones in the electronic device.

The fisheye lens or WFOV lens is also well known. The shooting range of a fisheye lens may be 220 or 230 degrees, so all of the views surrounding the electronic device may be collected by at most two fisheye lenses.

For example, as shown in FIG. 2, a fisheye lens or WFOV lens 211 is utilized to collect characteristic parameters of a surrounding user's face. The fisheye lens or WFOV lens 211 is placed at one side of the electronic device 21 and its collection range is shown in the figure. It may collect facial characteristic parameter of the user and obtain a distance and an orientation between the WFOV lens and the user.

As shown in FIG. 3, when N microphones 311 are installed an the electronic device 31 to form a microphone array, if a user makes a sound, all of the N microphones 311 collect sound waves of the sound from the user, and a volume of the user's sound, an orientation of the sound and a voiceprint characteristic parameter are determined according to the sound wave collected by the respective microphones and the direction of the sound wave. It should be noted that a position identification for the sound may be implemented according a phase difference of the sound. The microphone array utilized in the embodiment of the present disclosure is well known and will not be illustrated in detail. Preferably, as shown in FIG. 4, when the N microphones 411 in the electronic device 41 are utilized to form a microphone array, if there are a plurality of users beside the electronic device 41, the first user 41 and the second user 42 as shown in the figure, the microphone array may collect sound waves from the users respectively and classify the collected sound waves according to the voiceprint characteristic parameter to obtain characteristic parameters of the first user 41 and the second user 42. Its particular implementation is omitted for clarity.

When the first collection unit is a microphone array, the first characteristic parameter of the first user may be a sound parameter. The sound parameter may comprise a volume, a phase difference, an orientation of the sound or a voiceprint characteristic parameter.

When the first collection unit is a fisheye lens or a WFOV lens, the first characteristic parameter of the first user may comprise a facial characteristic parameter. The facial characteristic parameter may comprise a distance parameter and a facial image, or may comprise a distance parameter and an eye image, and so on.

The step of determining whether the first characteristic parameter satisfies the predefined first condition may comprise steps of: determining a distance from the first user to the first collection unit according to the sound parameter or the facial characteristic parameter; judging whether the distance from the first user to the first collection unit is smaller than a specified distance; deciding that the first characteristic parameter satisfies the predefined first condition if the distance is smaller than the specified distance; and deciding that the first characteristic parameter does not satisfy the predefined first condition if the distance is not smaller than the specified distance.

The step of determining a distance from the first user to the first collection unit according to the sound parameter or the facial characteristic parameter may comprise steps of: utilizing the volume or the phase difference of the sound parameters to calculate the distance from the first user to the first collection unit if the first parameter is a sound parameter; or utilizing the distance parameter as the distance from the first user to the first collection unit if the first characteristic parameter is a facial characteristic parameter. The technical solution of utilizing the volume or the phase difference of the sound parameters to calculate the distance from the first user to the first collection unit is well known, and its description is omitted for clarity.

Preferably, the step of determining a first position of the first user and identification information of the first user by utilizing the first characteristic parameter may comprise steps of: if the first characteristic parameter is a sound parameter, taking the orientation parameter of the sound parameter as the first position of the first user, extracting a voiceprint characteristic parameter from the sound parameters and comparing the voiceprint characteristic parameter with a voiceprint characteristic parameter in a stored user voiceprint characteristic table to extract identification information corresponding to the first user, wherein the user voiceprint characteristic table may comprise user identification information and a corresponding voiceprint characteristic parameter; or if the first characteristic parameter is a facial characteristic parameter, taking the orientation parameter of the facial characteristic parameter as the first position of the first user, extracting a facial characteristic value or an eye characteristic value from the facial characteristic parameters and comparing it with a facial characteristic value or an eye characteristic value in a stored user characteristic table to extract identification information corresponding to the first user.

The step of determining a second position of the first user according to the first characteristic parameter, judging whether the distance from the second position to the first position satisfies a second condition, and generating second response information when the second condition is satisfied may comprise steps of: if the first characteristic parameter is a sound parameter, determining the second position of the first user according the sound orientation of the currently obtained sound parameters, determining a distance from the second position to the first position, judging whether the distance is larger than a predefined threshold value, deciding that the distance from the second position to the first position satisfies the second condition and generating the second response information if the distance is smaller than the predefined threshold value, and taking no operation if the distance is not smaller than the predefined threshold value; or if the first characteristic parameter is a facial characteristic parameter, taking the orientation parameter of the facial characteristic parameter as the second position of the first user, determining a distance from the second position to the first position, judging whether the distance is larger than a predefined threshold value, deciding that the distance from the second position to the first position satisfies the second condition and generating the second response information if the distance is larger than the predefined threshold value, and taking no operation if the distance is not larger than the predefined threshold value.

The step of displaying the first user file at the updated first displaying position by the touch display unit according to the second instruction may comprise steps of: determining an updated first position of the first user file according to the second instruction; and displaying the first user file at the updated first displaying position.

Preferably, the method may comprising steps of: determining the second position of the first user according to the first characteristic parameter; judging whether a distance from the second position to the first position satisfies the second condition; judging whether there is any processing or operating on the first user file prior to generating the second response information if distance satisfies the second condition; if there is such processing or operating, staring a timer after completing the processing or operating; if the timer is larger than a predefined overtime threshold and no new processing instruction has been received for the first user file, determining the second position of the first user according to first characteristic parameter; judging whether the distance from the second position to the first position satisfies the second condition; generating second response information if the distance satisfies the second condition, wherein the predefined overtime threshold of the timer can be set according to actual requirement, e.g. 5 minutes or 10 minutes.

Thus, it may avoid movement of a file which occurs when the user needs to communicate with other users in a close range and will results in an updated position of the first user file, thereby ensuring the stability for users to view or operate files.

According to the technical solution of the embodiment of the present disclosure, it automatically selects a corresponding file for the user and displays it at an appropriate position when the user's first characteristic parameter satisfies the first condition. Consequently, it may automatically select and display a file which conforms to the user's status and position so as to provide more convenient environment for the users and to improve the user experience.

Furthermore, the technical solution of the embodiment of the present disclosure may update the displaying position of the file with the change of the user's position, and display the corresponding file at the updated displaying position. Thus, when the user only views the file and does not operate the file, it is not necessary for the user to manually move the file. The file will be moved according the user's movement, so as to further improve the user experience.

$3^{rd}$ Embodiment

The embodiment of the present disclosure provides an information processing method for use in an electronic device which may be a device with a large screen and includes a first collection unit and a touch display unit. When the first collection unit is in an operating state to collect a first characteristic parameter of at least one user in real time, as shown in FIG. 1, the method may comprise: step 101 of obtaining a current first characteristic parameter of a first user collected by the first collection unit; step 102 of judging whether the first characteristic parameter satisfies a predefined first condition, and generating first response information if the first characteristic parameter satisfies the predefined first condition; step 103 of determining a first position of the first user and identification information of the first user by utilizing the first characteristic parameter; step 104 of obtaining a corresponding first user file according to the identification information of the first user and determining a first displaying position according to the first position of the first user; step 105 of generating a first instruction by utilizing the first user file and the first displaying position; and step 106 of displaying the first user file at the first displaying position by the touch display unit according to the first instruction.

Here, the first collection unit may comprise a microphone array, and/or fisheye lens, and/or WOFV lens.

Among others, the microphone array is well known, and a microphone array may be formed by installing a plurality of microphones in the electronic device.

The fisheye lens or WFOV lens is also well known. The shooting range of a fisheye lens may be 220 or 230 degrees, so all of the views surrounding the electronic device may be collected by at most two fisheye lenses.

For example, as shown in FIG. 2, a fisheye lens or WFOV lens 211 is utilized to collect characteristic parameters of a surrounding user's face. The fisheye lens or WFOV lens 211 is placed at one side of the electronic device 21 and its collection range is shown in the figure. It may collect facial characteristic parameter of the user and obtain a distance and an orientation between the WFOV lens and the user.

As shown in FIG. 3, when N microphones 311 are installed an the electronic device 31 to form a microphone array, if a user makes a sound, all of the N microphones 311 collect sound waves of the sound from the user, and a volume of the user's sound, an orientation of the sound and a voiceprint characteristic parameter are determined according to the sound wave collected by the respective microphones and the direction of the sound wave. It should be noted that a position identification for the sound may be implemented according a phase difference of the sound. The microphone array utilized in the embodiment of the present disclosure is well known and will not be illustrated in detail. Preferably, as shown in FIG. 4, when the N microphones 411 in the electronic device 41 are utilized to form a microphone array, if there are a plurality of users beside the electronic device 41, the first user 41 and the second user 42 as shown in the figure, the microphone array may collect sound waves from the users respectively and classify the collected sound waves according to the voiceprint characteristic parameter to obtain characteristic parameters of the first user 41 and the second user 42. Its particular implementation is omitted herein for clarity.

When the first collection unit is a microphone array, the first characteristic parameter of the first user may be a sound parameter. The sound parameter may comprise a volume, a phase difference, an orientation of the sound or a voiceprint characteristic parameter.

When the first collection unit is a fisheye lens or a WFOV lens, the first characteristic parameter of the first user may comprise a facial characteristic parameter. The facial characteristic parameter may comprise a distance parameter and a facial image, or may comprise a distance parameter and an eye image, and so on.

The step of determining whether the first characteristic parameter satisfies the predefined first condition may comprise steps of: determining a distance from the first user to the first collection unit according to the sound parameter or the facial characteristic parameter; judging whether the distance from the first user to the first collection unit is smaller than a specified distance; deciding that the first characteristic parameter satisfies the predefined first condition if the distance is smaller than the specified distance; and deciding that the first characteristic parameter does not satisfy the predefined first condition if the distance is not smaller than the specified distance.

The step of determining a distance from the first user to the first collection unit according to the sound parameter or the facial characteristic parameter may comprise steps of: utilizing the volume or the phase difference of the sound parameters to calculate the distance from the first user to the first collection unit if the first parameter is a sound parameter; or utilizing the distance parameter as the distance from the first user to the first collection unit if the first characteristic parameter is a facial characteristic parameter. The technical solution of utilizing the volume or the phase difference of the sound parameters to calculate the distance from the first user to the first collection unit is well known, and its description is omitted for clarity.

Preferably, the step of determining a first position of the first user and identification information of the first user by utilizing the first characteristic parameter may comprise steps of: if the first characteristic parameter is a sound parameter, taking the orientation parameter of the sound parameter as the first position of the first user, extracting a voiceprint characteristic parameter from the sound parameter and comparing the voiceprint characteristic parameter with a voiceprint characteristic parameter in a stored user voiceprint characteristic table to extract identification information corresponding to the first user, wherein the user's voiceprint characteristic table may comprise user identification information and a corresponding voiceprint characteristic parameter; or if the first characteristic parameter is a facial characteristic parameter, taking the orientation parameter of the facial characteristic parameters as the first position of the first user, extracting a facial characteristic or an eye characteristic value from the facial characteristic parameter and comparing it with a facial characteristic value or an eye characteristic value in a stored user characteristic table to extract identification information corresponding to the first user.

After the step of displaying the first user file at the first displaying position by the touch display unit according to the first instruction, the method may further comprise steps of collecting a first characteristic parameter of the first user by the first collection unit; determining a second position of the first user according to the first characteristic parameter; judging whether the distance from the second position to the first position satisfies a second condition, and generating second response information when the second condition is satisfied; taking the second position as the updated first position according to the second response information; determining an updated first displaying position according to the updated first position; generating a second instruction by utilizing the updated first displaying position and the first user file; and displaying the first user file at the updated first displaying position by the touch display unit according to the second instruction.

The step of obtaining the corresponding first user file according to the identification information of the first user may comprise steps of: looking up all of the corresponding files according to the identification information of the first user; obtaining attribute parameters for all of the files; and selecting a first user file from all of the files according to the attribute parameters, wherein the attribute parameters include a file name, a last operating time for the file, times for operating the file and so on.

The step of selecting a first user file from all of the files according to the attribute parameters may comprise steps of: selecting a file which is last operated by the first user as the first user file according to last operation times for the files in the attribute parameters; or selecting a file on which the first user operates for the maximum number of times as the first user file according to operating numbers for files in the attribute parameters.

Thus, it may provide a file which better approaches the requirement to the user as the first user file.

The step of obtaining a corresponding first user file according to the identification information of the first user may comprise steps of: looking up all of the corresponding files according to the identification information of the first user; obtaining attribute parameters for all of the files; generating list information for all of the files corresponding to the first user by utilizing the attribute parameter; and taking the list information for all of the files as the first user file.

Preferably, the step of generating list information for all of the files corresponding to the first user by utilizing the attribute parameter may comprise a step of generating list information for all of the files corresponding to the first user by utilizing a file name in the attribute parameter for all of the files.

Preferably, after the step of taking the list information for all of the files as the first user file, it may further comprise steps of selecting a file to be operated from the list information by the user and displaying the file to be operated and selected by the user at the first displaying position.

Thus, all the stored files may be presented to the user so that the user may select a desired file from all of the files.

According to the technical solution of the embodiment of the present disclosure, it automatically selects a corresponding file for the user and displays it at an appropriate position when the user's first characteristic parameter satisfies the first condition. Consequently, it may automatically select and display a file which conforms to the user's status and position so as to provide a more convenient environment for users and to improve the user experience.

Furthermore, the technical solution of the embodiment of the present disclosure may update the displaying position of the file with the change of the user's position, and display the corresponding file at the updated displaying position. Thus, when the user only views the file and does not operate the file, it is not necessary for the user to manually move the file. The file will be moved according the user's movement, so as to further improve the user experience.

4$^{th}$ Embodiment

Figure 6:
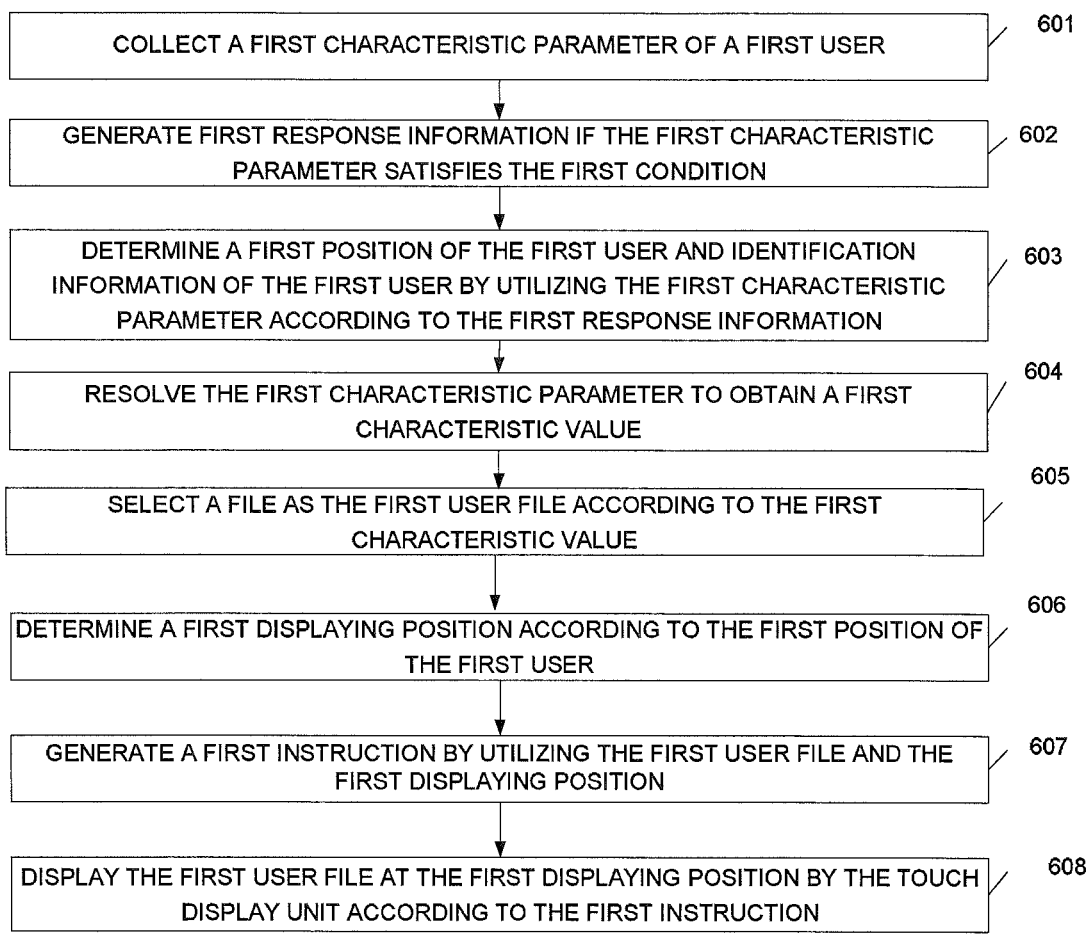
FIG. 6 is a third flowchart schematically showing an information processing method according to one embodiment of the present disclosure.

The embodiment of the present disclosure provides an information processing method for use in an electronic device which may be a device with a large screen and includes a first collection unit and a touch display unit. When the first collection unit is in an operating state to collect a first characteristic parameter of at least one user in real time, as shown in FIG. 6, the method may comprise: step 601 of obtaining a current first characteristic parameter of a first user collected by the first collection unit; step 602 of judging whether the first characteristic parameter satisfies a predefined first condition, and generating first response information if the first condition is satisfied; step 603 of determining a first position of the first user and identification information of the first user by utilizing the first characteristic parameter according to the first response information; step 604 of resolving the first characteristic parameter to obtain a first characteristic value. The first characteristic value represents first biologic characteristics of the first user. In an actual application, the first biologic characteristics may comprise facial characteristics, iris characteristics, retina characteristics, fingerprint characteristics, palm print characteristics or hand shape characteristics. The first biologic characteristics may utilize one or more of the above mentioned characteristics.

The information processing method may further comprise: step 605 of selecting a file including the first biologic characteristics from all of the files as the first user file according to the first characteristic value; step 606 of determining a first displaying position according to the first position of the first user; step 607 of generating a first instruction by utilizing the first user file and the first displaying position; and step 608 of displaying the first user file at the first displaying position by the touch display unit according to the first instruction.

Here, the first collection unit may comprise a microphone array, and/or fisheye lens, and/or WOFV lens.

Among others, the microphone array is well known, and a microphone array may be formed by installing a plurality of microphones in the electronic device.

The fisheye lens or WFOV lens is also well known. The shooting range of a fisheye lens may be 220 or 230 degrees, so all of the views surrounding the electronic device may be collected by at most two fisheye lenses.

For example, as shown in FIG. 2, a fisheye lens or WFOV lens 211 is utilized to collect characteristic parameters of a surrounding user's face. The fisheye lens or WFOV lens 211 is placed at one side of the electronic device 21 and its collection range is shown in the figure. It may collect facial characteristic parameters of the user and obtain a distance and an orientation between the WFOV lens and the user.

As shown in FIG. 3, when N microphones 311 are installed an the electronic device 31 to form a microphone array, if a user makes a sound, all of the N microphones 311 collect sound waves of the sound from the user, and a volume of the user's sound, an orientation of the sound, and a voiceprint characteristic parameter are determined according to the sound wave collected by the respective microphones and the direction of the sound wave. It should be noted that a position identification for the sound may be implemented according a phase difference of the sound. The microphone array utilized in the embodiment of the present disclosure is well known and will not be illustrated in detail. Preferably, as shown in FIG. 4, when the N microphones 411 in the electronic device 41 are utilized to form a microphone array, if there are a plurality of users beside the electronic device 41, the first user 41 and the second user 42 as shown in the figure, the microphone array may collect sound waves from the users respectively and classify the collected sound waves according to the voiceprint characteristic parameter to obtain characteristic parameters of the first user 41 and the second user 42. Its particular implementation is omitted for clarity.

When the first collection unit is a microphone array, the first characteristic parameter of the first user may be a sound parameter. The sound parameter may comprise a volume, a phase difference, an orientation of the sound or a voiceprint characteristic parameter.

When the first collection unit is a fisheye lens or a WFOV lens, the first characteristic parameter of the first user may comprise a facial characteristic parameter. The facial characteristic parameter may comprise a distance parameter and a facial image, or may comprise a distance parameter and an eye image, and so on.

The step of determining whether the first characteristic parameter satisfies the predefined first condition may comprise steps of: determining a distance from the first user to the first collection unit according to the sound parameter or the facial characteristic parameter; judging whether the distance from the first user to the first collection unit is smaller than a specified distance; deciding that the first characteristic parameter satisfies the predefined first condition if the distance is smaller than the specified distance; and deciding that the first characteristic parameter does not satisfy the predefined first condition if the distance is not smaller than the specified distance.

The step of determining a distance from the first user to the first collection unit according to the sound parameter or the facial characteristic parameter may comprise steps of: utilizing the volume or the phase difference of the sound parameters to calculate the distance from the first user to the first collection unit if the first parameter is a sound parameter; or utilizing the distance parameter as the distance from the first user to the first collection unit if the first characteristic parameter is a facial characteristic parameter. The technical solution of utilizing the volume or the phase difference of the sound parameters to calculate the distance from the first user to the first collection unit is well known, and its description is omitted for clarity.

Preferably, the step of determining a first position of the first user and identification information of the first user by utilizing the first characteristic parameter may comprise steps of: if the first characteristic parameter is a sound parameter, taking the orientation parameter of the sound parameter as the first position of the first user, extracting a voiceprint characteristic parameter from the sound parameter and comparing the voiceprint characteristic parameter with a voiceprint characteristic parameter in a stored user voiceprint characteristic table to extract identification information corresponding to the first user, wherein the user's voiceprint characteristic table may comprise user identification information and a corresponding voiceprint characteristic parameter; or if the first characteristic parameter is a facial characteristic parameter, taking the orientation parameter of the facial characteristic parameters as the first position of the first user, extracting a facial characteristic or an eye characteristic value from the facial characteristic parameter and comparing it with a facial characteristic value or an eye characteristic value in a stored user characteristic table to extract identification information corresponding to the first user.

The present embodiment will be illustrated with reference to a particular application. Taking a shake operation as a trigger operation, when the user needs to share pictures stored in a mobile phone which includes a specific user's picture, the user holds the mobile phone to shake along a gravity direction; if the mobile phone detects a reciprocating movement along the gravity direction, the mobile phone controls its own camera (a first collection unit) to collect a facial image for the specific user (a first characteristic parameter), resolves the collected facial image to obtain a facial characteristic value (a first characteristic value); it determines a picture (a first user file) including the facial characteristic value according to the facial characteristic value and displays the determined picture.

According to the technical solution of the embodiment of the present disclosure, it automatically selects a corresponding file for the user and displays it at an appropriate position when the user's first characteristic parameter satisfies the first condition. Consequently, it may automatically select and display a file which conforms to the user's status and position so as to provide a more convenient environment for users and to improve the user experience. The electronic device utilizes a biologic characteristic matching mechanism to determine the file corresponding to the user's first biologic characteristics from all of the files, which saves time for the user to manually look up the file and is more applicable to a multi-user sharing scene, thereby improving the user experience.

5$^{th}$ Embodiment

The embodiment of the present disclosure provides an information processing method for use in an electronic device which may be a device with a large screen and includes a first collection unit and a touch display unit. When the first collection unit is in an operating state to collect a first characteristic parameter of at least one user in real time, a second collection unit may collect a second characteristic parameter corresponding to second biologic characteristics. The first characteristic value corresponding to the first characteristic parameter and the second characteristic value corresponding to the second characteristic parameter represent first biologic characteristics and second biologic characteristics, respectively. The first biologic characteristics and the second biologic characteristics may comprise facial characteristics, iris characteristics, retina characteristics, fingerprint characteristics, palm print characteristics and hand shape characteristics. The first biologic characteristics may utilize one or more of the above mentioned characteristics. The second biologic characteristic may utilize one or more of the above mentioned characteristics different from that of the first biologic characteristics. For example, when the first biologic characteristic is facial characteristics, the second biologic characteristics may be fingerprint characteristics.

Figure 7:
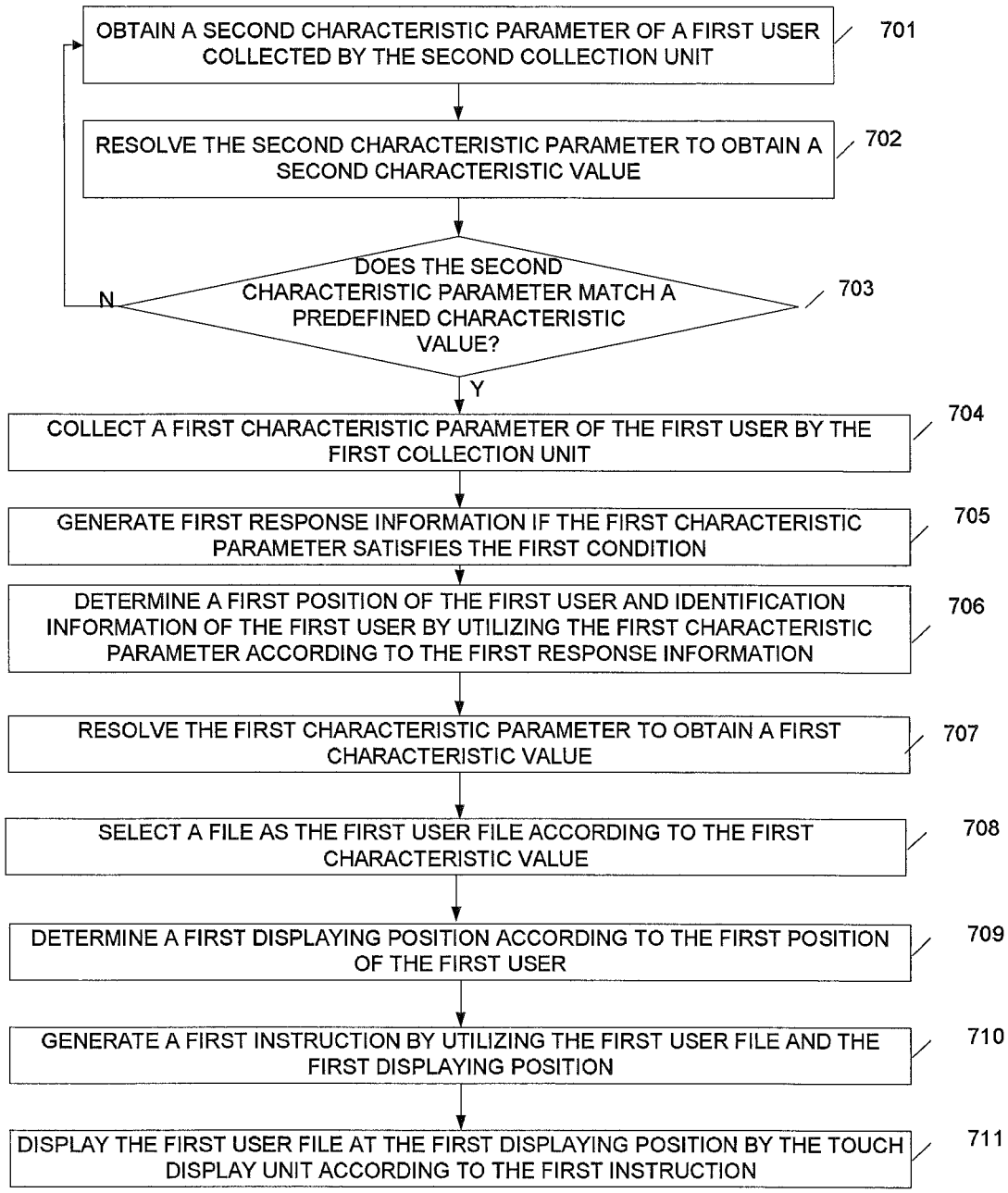
FIG. 7 is a fourth flowchart schematically showing an information processing method according to one embodiment of the present disclosure.

As shown in FIG. 7, the method may comprise: step 701 of obtaining a second characteristic parameter of a first user collected by the second collection unit; step 702 of resolving the second characteristic parameter to obtain a second characteristic value, the second characteristic value representing second biologic characteristics of the user of the electronic device and being different from the first biologic characteristics; step 703 of determining whether the second characteristic parameter matches a predefined characteristic value, performing step 704 if the second characteristic parameter matches the predefined characteristic value, and otherwise returning to step 701; step 704 of obtaining a current first characteristic parameter of the first user collected by the first collection unit; step 705 of judging whether the first characteristic parameter satisfies a predefined first condition, and generating first response information if the first condition is satisfied; step 706 of determining a first position of the first user and identification information of the first user by utilizing the first characteristic parameter according to the first response information; step 707 of resolving the first characteristic parameter to obtain a first characteristic value; step 708 of selecting a file including the first biologic characteristics from all of the files as the first user file according to the first characteristic value; step 709 of determining a first displaying position according to the first position of the first user; step 710 of generating a first instruction by utilizing the first user file and the first displaying position; and step 711 of displaying the first user file at the first displaying position by the touch display unit according to the first instruction.

Here, the first collection unit may comprise a microphone array, and/or fisheye lens, and/or WOFV lens.

Among others, the microphone array is well known, and a microphone array may be formed by installing a plurality of microphones in the electronic device.

The fisheye lens or WFOV lens is also well known. The shooting range of a fisheye lens may be 220 or 230 degrees, so all of the views surrounding the electronic device may be collected by at most two fisheye lenses.

For example, as shown in FIG. 2, a fisheye lens or WFOV lens 211 is utilized to collect characteristic parameters of a surrounding user's face. The fisheye lens or WFOV lens 211 is placed at one side of the electronic device 21 and its collection range is shown in the figure. It may collect facial characteristic parameter of the user and obtain a distance and an orientation between the WFOV lens and the user.

As shown in FIG. 3, when N microphones 311 are installed an the electronic device 31 to form a microphone array, if a user makes a sound, all of the N microphones 311 collect sound waves of the sound from the user, and a volume of the user's sound, an orientation of the sound and a voiceprint characteristic parameter are determined according to the sound wave collected by the respective microphones and the direction of the sound wave. It should be noted that a position identification for the sound may be implemented according a phase difference of the sound. The microphone array utilized in the embodiment of the present disclosure is well known and will not be illustrated in detail. Preferably, as shown in FIG. 4, when the N microphones 411 in the electronic device 41 are utilized to form a microphone array, if there are a plurality of users beside the electronic device 41, the first user 41 and the second user 42 as shown in the figure, the microphone array may collect sound waves from the users respectively and classify the collected sound waves according to the voiceprint characteristic parameter to obtain characteristic parameters of the first user 41 and the second user 42. Its particular implementation is omitted for clarity.

When the first collection unit is a microphone array, the first characteristic parameter of the first user may be a sound parameter. The sound parameter may comprise a volume, a phase difference, an orientation of the sound or a voiceprint characteristic parameter.

When the first collection unit is a fisheye lens or a WFOV lens, the first characteristic parameter of the first user may comprise a facial characteristic parameter. The facial characteristic parameter may comprise a distance parameter and a facial image, or may comprise a distance parameter and an eye image, and so on.

The step of determining whether the first characteristic parameter satisfies the predefined first condition may comprise steps of: determining a distance from the first user to the first collection unit according to the sound parameter or the facial characteristic parameter; judging whether the distance from the first user to the first collection unit is smaller than a specified distance; deciding that the first characteristic parameter satisfies the predefined first condition if the distance is smaller than the specified distance; and deciding that the first characteristic parameter does not satisfy the predefined first condition if the distance is not smaller than the specified distance.

The step of determining a distance from the first user to the first collection unit according to the sound parameter or the facial characteristic parameter may comprise steps of: utilizing the volume or the phase difference of the sound parameters to calculate the distance from the first user to the first collection unit if the first parameter is a sound parameter; or utilizing the distance parameter as the distance from the first user to the first collection unit if the first characteristic parameter is a facial characteristic parameter.

Preferably, the step of determining a first position of the first user and identification information of the first user by utilizing the first characteristic parameter may comprise steps of: if the first characteristic parameter is a sound parameter, taking the orientation parameter of the sound parameter as the first position of the first user, extracting a voiceprint characteristic parameter from the sound parameter and comparing the voiceprint characteristic parameter with a voiceprint characteristic parameter in a stored user voiceprint characteristic table to extract identification information corresponding to the first user, wherein the user's voiceprint characteristic table may comprise user identification information and a corresponding voiceprint characteristic parameter; or if the first characteristic parameter is a facial characteristic parameter, taking the orientation parameter of the facial characteristic parameters as the first position of the first user, extracting a facial characteristic or an eye characteristic value from the facial characteristic parameter and comparing it with a facial characteristic value or an eye characteristic value in a stored user characteristic table to extract identification information corresponding to the first user.

In the present embodiment, when the second characteristic value does not match the predefined characteristic value, it may be identified that the current user of the electronic device does not pass a verification of validity. Correspondingly, the information which represents that the current user does not pass a verification of validity may be displayed, or a predefined file which does not need a verification of validity in the electronic device may be displayed, e.g. a multimedia file.

In the present embodiment, the step of selecting a file including the first biologic characteristics from all of the files as the first user file according to the first characteristic value may further comprise steps of: resolving each file in all of the files to get a third characteristic value of the user corresponding to each file, the third characteristic value representing first biologic characteristics of the user corresponding to each file; determining files having the same third characteristic value in all of the files; and determining the relationship between the third characteristic value and the files having the third characteristic value.

For example, after the electronic device obtains a plurality of pictures, the relationship between the facial characteristic values and the pictures is determined by resolving a facial characteristic value of each file to obtain a plurality of different third characteristic values and determining pictures having the same third characteristic value in the pictures. The electronic device may determine the pictures corresponding to the current user based on the relationship, thereby saving the time for the user to manually search for the pictures, which is more applicable to a multi-user sharing scene and a large scale information sharing scene, thereby improving the user experience.

The present embodiment will be illustrated with reference to a particular application. Taking a shake operation as a trigger operation, when the user needs to share pictures stored in a mobile phone which includes a specific user's picture, the user holds the mobile phone to shake along a gravity direction; if the mobile phone detects a reciprocating movement along the gravity direction, the mobile phone controls a second collection unit to collect a second characteristic parameter, resolves the second characteristic parameter to obtain fingerprint characteristics of the current user, matches the fingerprint to the stored fingerprint characteristic, and, if they match, controls its own camera (a first collection unit) to collect a facial image for the specific user (a first characteristic parameter), resolves the collected facial image to obtain a facial characteristic value (a first characteristic value); it determines a picture (a first user file) including the facial characteristic value according to the facial characteristic value and displays the determined picture.

In the present embodiment, the electronic device utilizes a biologic characteristic matching mechanism to determine the file corresponding to the user's first biologic characteristics from all of the files, which saves the time for the user to manually look up the file and is more applicable to a multi-user sharing scene, thereby improving the user experience. Furthermore, before the first user file is determined, the second biologic characteristics are utilized to determine whether the user carrying out the trigger operation is valid to guarantee the information safety. Furthermore, if the current user does not pass the validity verification, the electronic device presents information indicating that the current user does not pass the validity verification or presents information which can be presented without any validity identification. Thus, it humanizes the human-computer interaction and improves the user experience.

6$^{th}$ Embodiment

Figure 8:
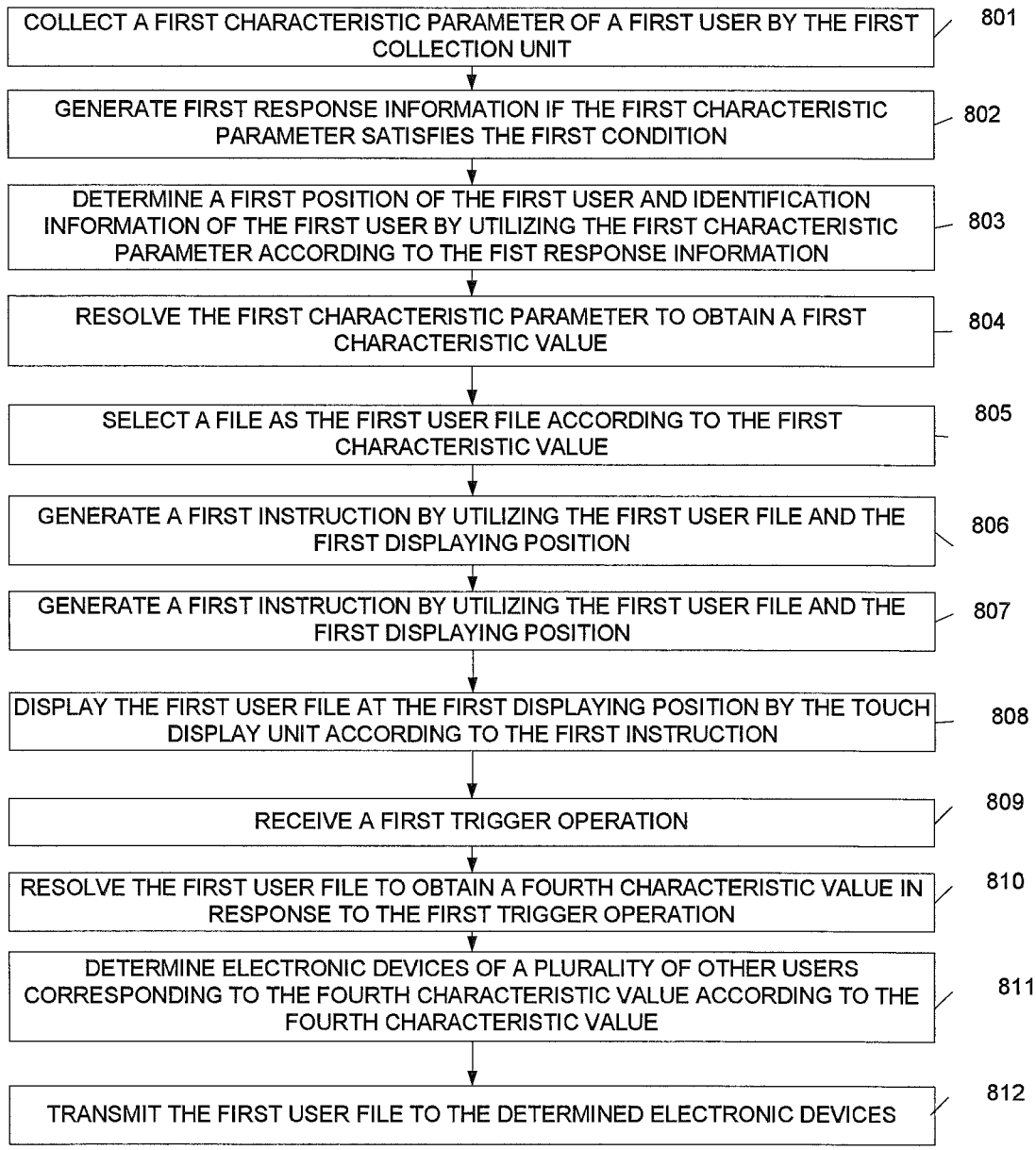
FIG. 8 is a fifth flowchart schematically showing an information processing method according to one embodiment of the present disclosure.

The embodiment of the present disclosure provides an information processing method for use in an electronic device which may be a device with a large screen and includes a first collection unit and a touch display unit. When the first collection unit is in an operating state to collect a first characteristic parameter of at least one user in real time, as shown in FIG. 8, the method may comprise: step 801 of obtaining a current first characteristic parameter of a first user collected by the first collection unit; step 802 of judging whether the first characteristic parameter satisfies a predefined first condition, and generating first response information if the first condition is satisfied; step 803 of determining a first position of the first user and identification information of the first user by utilizing the first characteristic parameter according to the first response information; step 804 of resolving the first characteristic parameter to obtain a first characteristic value. The first characteristic value represents first biologic characteristics of the first user. In an actual application, the first biologic characteristics may comprise facial characteristics, iris characteristics, retina characteristics, fingerprint characteristics, palm print characteristics and hand shape characteristics. The first biologic characteristics may utilize one or more of the above mentioned characteristics.

The method may further comprise: step 805 of selecting a file including the first biologic characteristics from all of the files as the first user file according to the first characteristic value; step 806 of determining a first displaying position according to the first position of the first user; step 807 of generating a first instruction by utilizing the first user file and the first displaying position; step 808 of displaying the first user file at the first displaying position by the touch display unit according to the first instruction; step 809 of receiving a first trigger operation; step 810 of resolving the first user file to obtain a fourth characteristic value in response to the first trigger operation, the fourth characteristic value representing first biologic characteristics of a plurality of other users corresponding to the first user file; step 811 of determining an electronic device of the plurality of other users corresponding to the fourth characteristic value according to the fourth characteristic value and the relationship between the fourth characteristic value and the electronic device; and step 812 of transmitting the first user file to the determined electronic device.

Here, the first collection unit may comprise a microphone array, and/or fisheye lens, and/or WOFV lens.

Among others, the microphone array is well known, and a microphone array may be formed by installing a plurality of microphones in the electronic device.

The fisheye lens or WFOV lens is also well known. The shooting range of a fisheye lens may be 220 or 230 degrees, so all of the views surrounding the electronic device may be collected by at most two fisheye lenses.

For example, as shown in FIG. 2, a fisheye lens or WFOV lens 211 is utilized to collect characteristic parameters of a surrounding user's face. The fisheye lens or WFOV lens 211 is placed at one side of the electronic device 21 and its collection range is shown in the figure. It may collect facial characteristic parameter of the user and obtain a distance and an orientation between the WFOV lens and the user.

As shown in FIG. 3, when N microphones 311 are installed an the electronic device 31 to form a microphone array, if a user makes a sound, all of the N microphones 311 collect sound waves of the sound from the user, and a volume of the user's sound, an orientation of the sound and a voiceprint characteristic parameter are determined according to the sound wave collected by the respective microphones and the direction of the sound wave. It should be noted that a position identification for the sound may be implemented according a phase difference of the sound. The microphone array utilized in the embodiment of the present disclosure is well known and will not be illustrated in detail. Preferably, as shown in FIG. 4, when the N microphones 411 in the electronic device 41 are utilized to form a microphone array, if there are a plurality of users beside the electronic device 41, the first user 41 and the second user 42 as shown in the figure, the microphone array may collect sound waves from the users respectively and classify the collected sound waves according to the voiceprint characteristic parameter to obtain characteristic parameters of the first user 41 and the second user 42. Its particular implementation is omitted for clarity.

When the first collection unit is a microphone array, the first characteristic parameter of the first user may be a sound parameter. The sound parameter may comprise a volume, a phase difference, an orientation of the sound or a voiceprint characteristic parameter.

When the first collection unit is a fisheye lens or a WFOV lens, the first characteristic parameter of the first user may comprise a facial characteristic parameter. The facial characteristic parameter may comprise a distance parameter and a facial image, or may comprise a distance parameter and an eye image, and so on.

The step of determining whether the first characteristic parameter satisfies the predefined first condition may comprise steps of: determining a distance from the first user to the first collection unit according to the sound parameter or the facial characteristic parameter; judging whether the distance from the first user to the first collection unit is smaller than a specified distance; deciding that the first characteristic parameter satisfies the predefined first condition if the distance is smaller than the specified distance; and deciding that the first characteristic parameter does not satisfy the predefined first condition if the distance is not smaller than the specified distance.

The step of determining a distance from the first user to the first collection unit according to the sound parameter or the facial characteristic parameter may comprise steps of: utilizing the volume or the phase difference of the sound parameters to calculate the distance from the first user to the first collection unit if the first parameter is a sound parameter; or utilizing the distance parameter as the distance from the first user to the first collection unit if the first characteristic parameter is a facial characteristic parameter.

Preferably, the step of determining a first position of the first user and identification information of the first user by utilizing the first characteristic parameter may comprise steps of: if the first characteristic parameter is a sound parameter, taking the orientation parameter of the sound parameter as the first position of the first user, extracting a voiceprint characteristic parameter from the sound parameter and comparing the voiceprint characteristic parameter with a voiceprint characteristic parameter in a stored user voiceprint characteristic table to extract identification information corresponding to the first user, wherein the user's voiceprint characteristic table may comprise user identification information and a corresponding voiceprint characteristic parameter; or if the first characteristic parameter is a facial characteristic parameter, taking the orientation parameter of the facial characteristic parameters as the first position of the first user, extracting a facial characteristic or an eye characteristic value from the facial characteristic parameter and comparing it with a facial characteristic value or an eye characteristic value in a stored user characteristic table to extract identification information corresponding to the first user.

The present embodiment will be illustrated with reference to a particular application. Taking a shake operation as a trigger operation, when the user needs to share pictures stored in a mobile phone which includes a specific user's picture, the user holds the mobile phone to shake along a gravity direction; if the mobile phone detects a reciprocating movement along the gravity direction, the mobile phone controls its own camera (a first collection unit) to collect a facial image (a first characteristic parameter) of the specific user, resolves the collected facial image to obtain a facial characteristic value (a first characteristic value), determines a picture (a first user file) having the facial characteristic value according to the facial characteristic value and displays the determined picture. When the user needs to transmit the picture currently displayed by the electronic device to all of persons in the picture, a trigger operating is carried out. In response to receiving the trigger operation, the electronic device resolves the facial characteristic values (a fourth characteristic value) for all of the persons in the picture, and determines electronic devices corresponding to all of the persons in the picture according to the relationship between the fourth characteristic value and the electronic device and transmits the currently displayed picture to the determined electronic devices.

In the present embodiment, the electronic device utilizes a biologic characteristic matching mechanism to determine the file corresponding to the user's first biologic characteristics from all of the files, which saves time for the user to manually look up the file and is more applicable to a multi-user sharing scene, thereby improving the user experience. Furthermore, the electronic device supports transmission of the first user file to an electronic device corresponding to the fourth characteristics according to a fourth characteristic value of the other users related to the first user file. The operation is convenient.

7th Embodiment

Figure 9:
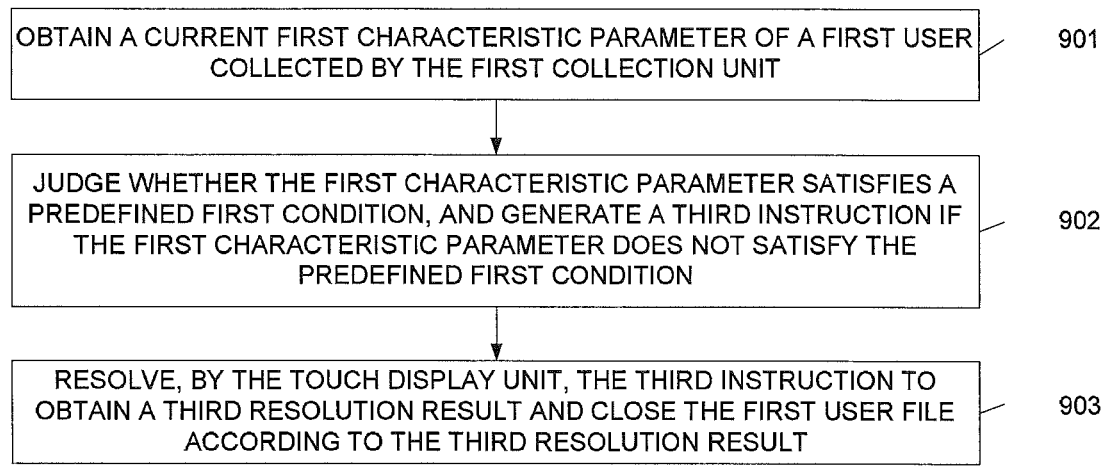
FIG. 9 is a sixth flowchart schematically showing an information processing method according to one embodiment of the present disclosure.

The embodiment of the present disclosure further provides an information processing method for use in an electronic device which may be a device with a large screen and includes a first collection unit and a touch display unit. When the first collection unit is in an operating state to collect a first characteristic parameter of at least one user in real time, as shown in FIG. 9, the method may comprise: step 901 of obtaining a current first characteristic parameter of a first user collected by the first collection unit; step 902 of judging whether the first characteristic parameter satisfies a predefined first condition, and generating a third instruction if the first characteristic parameter does not satisfy the predefined first condition; and step 903 of resolving, by the touch display unit, the third instruction to obtain a third resolution result and closing the first user file according to the third resolution result.

The first collection unit may comprise a microphone array, and/or fisheye lens, and/or WOFV lens.

Among others, the microphone array is well known, and a microphone array may be formed by installing a plurality of microphones in the electronic device. The fisheye lens or WFOV lens is also well known. The shooting range of a fisheye lens may be 220 or 230 degrees, so all of the views surrounding the electronic device may be collected by at most two fisheye lenses.

When the first collection unit is a microphone array, the first characteristic parameter of the first user may be a sound parameter. The sound parameter may comprise a volume, a phase difference, an orientation of the sound or a voiceprint characteristic parameter.

When the first collection unit is a fisheye lens or a WFOV lens, the first characteristic parameter of the first user may comprise a facial characteristic parameter. The facial characteristic parameter may comprise a distance parameter and a facial image, or may comprise a distance parameter and an eye image, and so on.

The step of determining whether the first characteristic parameter satisfies the predefined first condition may comprise steps of: determining a distance from the first user to the first collection unit according to the sound parameter or the facial characteristic parameter; judging whether the distance from the first user to the first collection unit is smaller than a specified distance; deciding that the first characteristic parameter satisfies the predefined first condition if the distance is smaller than the specified distance; and deciding that the first characteristic parameter does not satisfy the predefined first condition if the distance is not smaller than the specified distance.

The step of determining a distance from the first user to the first collection unit according to the sound parameter or the facial characteristic parameter may comprise steps of: utilizing the volume or the phase difference of the sound parameters to calculate the distance from the first user to the first collection unit if the first parameter is a sound parameter; or utilizing the distance parameter as the distance from the first user to the first collection unit if the first characteristic parameter is a facial characteristic parameter. The technical solution of utilizing the volume or the phase difference of the sound parameters to calculate the distance from the first user to the first collection unit is well known, and its description is omitted for clarity.

Preferably, the step of judging whether the first characteristic parameter satisfies a predefined first condition and generating a third instruction if the first characteristic parameter does not satisfy a predefined first condition may comprise a step of performing subsequent operations according to the method of any one of embodiments 1 to 3 if the first characteristic parameter satisfies the predefined first condition, which is omitted herein for clarity.

Preferably, the step of generating a third instruction may comprise steps of: determining identification information of the first user according to the first characteristic parameter; determining a corresponding first user file according to the identification information of the first user; selecting the first user file from a list for all of the currently opened files and taking an instruction for closing the first user file as the third instruction.

One scene in which the embodiments mentioned above are implemented is taken as an example, the method may further comprise steps of: continuing collecting the first characteristic parameter of the first user in real time when the first user file is displayed at the first displaying position of the touch display unit; judging whether the distance from the first user to the first collecting unit is larger than a predefined threshold value according to the first characteristic parameter, deciding that the predefined first condition is not satisfied if the distance is larger than the predefined threshold value; determining identification information of the first user according to the first characteristic parameter; determining the corresponding first user file according to the identification information of the first user; selecting the first user file from a list of all of the currently opened files; and taking an instruction for closing the first user file as the third instruction; and closing the first user filed displayed in the touch display unit according to the third instruction.

According to the technical solution of the embodiment of the present disclosure, it automatically closes corresponding files for the user if it is detected that the first characteristic parameter of the user does not satisfy the first condition when the file is displayed at the users corresponding positions. Consequently, it may avoid a problem of forgetting closing the file when the user departs from the electronic device, so as to protect the users privacy.

$8^{th}$ Embodiment

Figure 10:
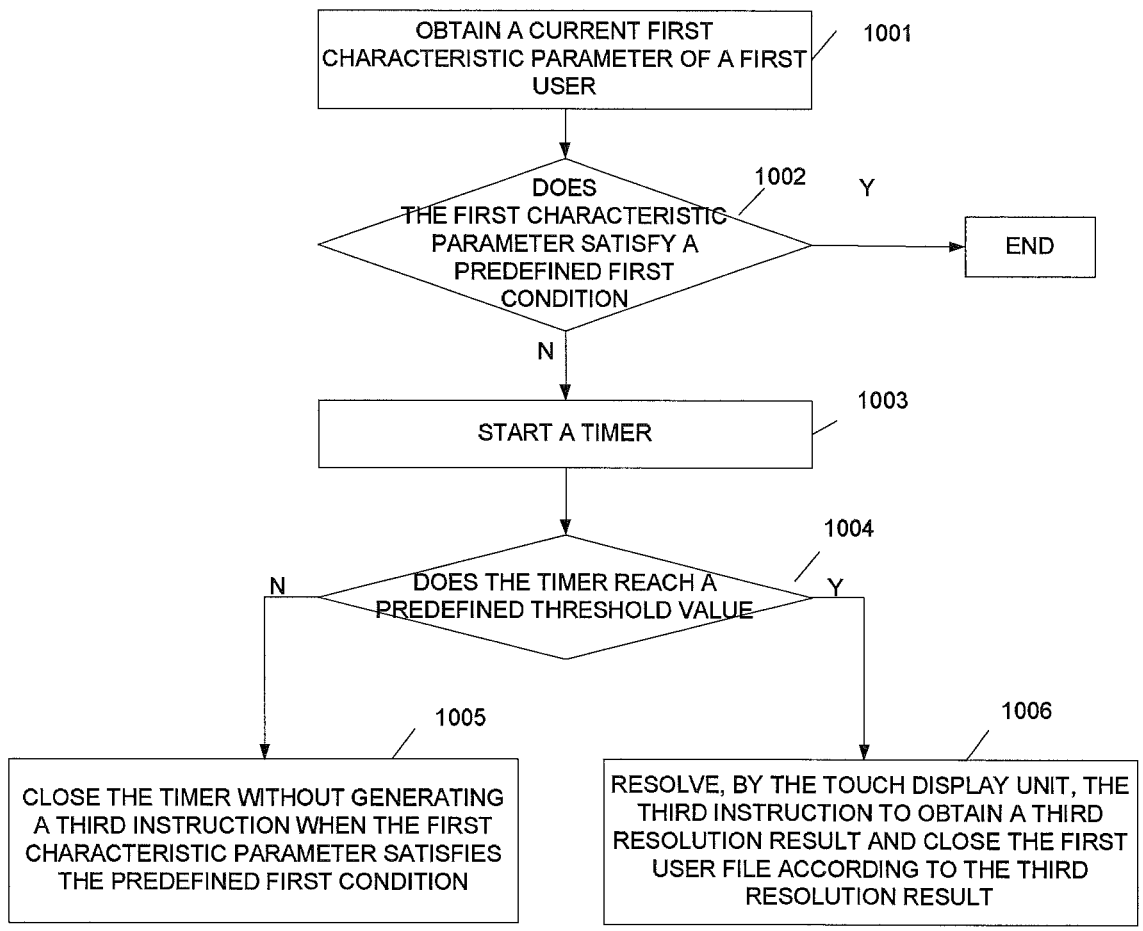
FIG. 10 is a seventh flowchart schematically showing an information processing method according to one embodiment of the present disclosure.

The embodiment of the present disclosure further provides an information processing method for use in an electronic device which may be a device with a large screen and includes a first collection unit and a touch display unit. When the first collection unit is in an operating state to collect a first characteristic parameter of at least one user in real time, as shown in FIG. 10, the method may comprise: step 1001 of obtaining a current first characteristic parameter of a first user collected by the first collection unit; step 1002 of judging whether the first characteristic parameter satisfies a predefined first condition, and returning to step 1003 if the first condition is not satisfied; otherwise, the flow is ended; step 1003 of starting a timer; step 1004 of judging whether the timer reaches a predefined threshold value; turning to step 1005 if the timer does not reach the predefined threshold value and turning to step 1006 if the timer reaches the predefined threshold value. The step 1005 may be a step of closing the timer without generating a third instruction when the first characteristic parameter satisfies the predefined first condition and the timer does not reach the predefined threshold value, to end the flow. The step 1006 may be a step of resolving, by the touch display unit, the third instruction to obtain a third resolution result and closing the first user file according to the third resolution result.

The first collection unit may comprise a microphone array, and/or fisheye lens, and/or WOFV lens.

The microphone array is well known, and a microphone array may be formed by installing a plurality of microphones in the electronic device. The fisheye lens or WFOV lens is also well known. The shooting range of a fisheye lens may be 220 or 230 degrees, so all of the views surrounding the electronic device may be collected by at most two fisheye lenses.

When the first collection unit is a microphone array, the first characteristic parameter of the first user may be a sound parameter. The sound parameter may comprise a volume, a phase difference, an orientation of the sound or a voiceprint characteristic parameter.

When the first collection unit is a fisheye lens or a WFOV lens, the first characteristic parameter of the first user may comprise a facial characteristic parameter. The facial characteristic parameter may comprise a distance parameter and a facial image, or may comprise a distance parameter and an eye image, and so on.

The step of determining whether the first characteristic parameter satisfies the predefined first condition may comprise steps of: determining a distance from the first user to the first collection unit according to the sound parameter or the facial characteristic parameter; judging whether the distance from the first user to the first collection unit is smaller than a specified distance; deciding that the first characteristic parameter satisfies the predefined first condition if the distance is smaller than the specified distance; and deciding that the first characteristic parameter does not satisfy the predefined first condition if the distance is not smaller than the specified distance.

Figure 11:
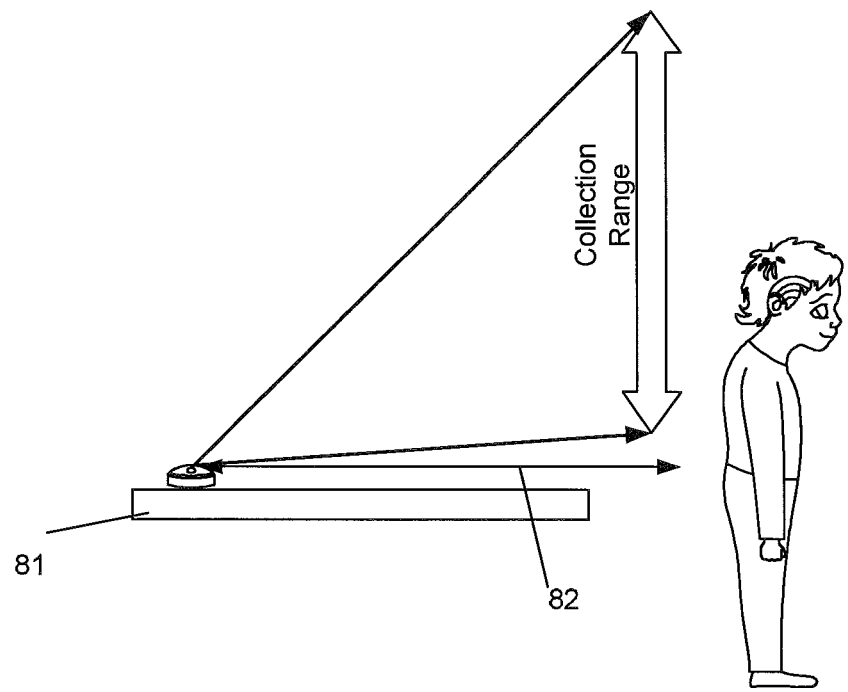
FIG. 11 is the fourth usage scene according to an embodiment of the present disclosure.

For example, as shown in FIG. 11, a WFOV lens or a fisheye lens is utilized to collect characteristic parameters of a surrounding user's face. The WFOV lens or a fisheye lens is placed at one side of the electronic device 21 and its collection range is shown in the figure. When the distance 82 from the user to the first collection unit is not smaller than the specified range, it is decided that the first characteristic parameter does not satisfy the first condition.

Figure 12:
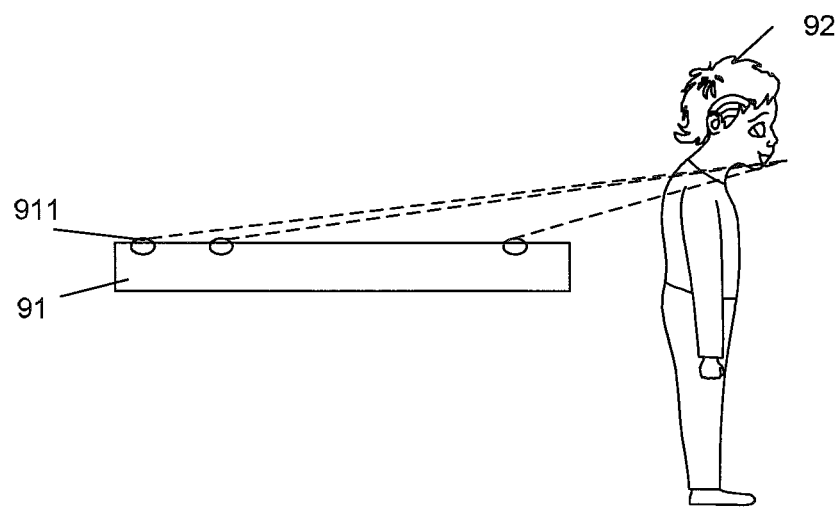
FIG. 12 is the fifth usage scene according to an embodiment of the present disclosure.

Or as shown in FIG. 12, N microphones 911 are installed an the electronic device 91 to form a microphone array to collect the sound from the first user 92 in real time; when the first user 92 turns around and leaves away from the electronic device 91, the microphone array may analyze a distance, an orientation and a voiceprint characteristic parameter of the first user 92 according to the sound wave collected by the N microphones 911; and it is decided that the first characteristic value does not satisfy the predefined first condition if it is decided that the distance from the first user 92 to the electronic device is not smaller than the specified distance.

The step of determining a distance from the first user to the first collection unit according to the sound parameter or the facial characteristic parameter may comprise steps of: utilizing the volume or the phase difference of the sound parameters to calculate the distance from the first user to the first collection unit if the first parameter is a sound parameter; or utilizing the distance parameter as the distance from the first user to the first collection unit if the first characteristic parameter is a facial characteristic parameter. The technical solution of utilizing the volume or the phase difference of the sound parameters to calculate the distance from the first user to the first collection unit is well known, and its description is omitted for clarity.

Preferably, the step of judging whether the first characteristic parameter satisfies a predefined first condition and generating a third instruction if not may comprise a step of performing subsequent operations according to the method of any one of embodiments 1 to 3 if the first characteristic parameter satisfies the predefined first condition, which is omitted herein for clarity.

Preferably, the step of generating a third instruction may comprise steps of: determining identification information of the first user according to the first characteristic parameter; determining a corresponding first user file according to the identification information of the first user; selecting the first user file from a list for all of the currently opened files and taking an instruction for closing the first user file as the third instruction.

One scene in which the embodiment mentioned above is implemented is taken as an example. The method may further comprise steps of: continuing collecting the first characteristic parameter of the first user in real time when the first user file is displayed at the first displaying position of the touch display unit; judging whether the distance from the first user to the first collecting unit is larger than a predefined threshold value according to the characteristic parameter, deciding that the predefined first condition is not satisfied if the distance is larger than the predefined threshold value; determining identification information of the first user according to the first characteristic parameter; determining the corresponding first user file according to the identification information of the first user; selecting the first user file from a list of all of the currently opened files; and taking an instruction for closing the first user file as the third instruction; and closing the first user filed displayed in the touch display unit as the third instruction.

Preferably, it continues performing step 1001 after step 1005.

According to the technical solution of the embodiment of the present disclosure, it automatically closes corresponding files for the user if it is detected that the first characteristic parameter of the user does not satisfy the first condition when the file is displayed at the user's corresponding positions. Consequently, it may avoid a problem of forgetting closing the file when the user departs from the electronic device so as to protect the user's privacy.

Furthermore, a timer may be added to judge whether the first characteristic parameter satisfies the first condition before the third instruction is generated. Thus, when the user is a little far away from the large screen but does not exit, it avoids operations of frequently closing and opening the first file, so as to ensure the user's operation experience.

9th Embodiment

Figure 13:
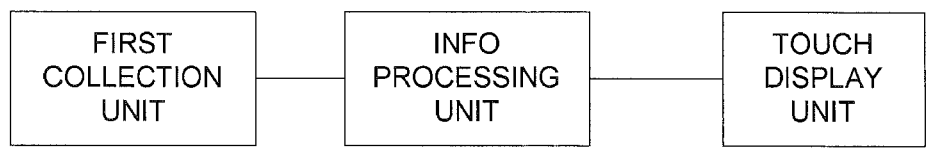
FIG. 13 is a schematic view showing the structure of the electronic device according to one embodiment of the present invention.

The embodiment of the present disclosure provides an electronic device which may be a device with a large screen and includes a first collection unit, a touch display unit and an information processing unit as shown in FIG. 13, wherein the first collection unit is configured to collect a first characteristic parameter of a first user in real time in an operating state, and to transmit the first characteristic parameter to the information processing unit; the information processing unit is configured to obtain a current first characteristic parameter of a first user collected by the first collection unit, to judge whether the first characteristic parameter satisfies a predefined first condition and to generate first response information if the first condition is satisfied, to determine a first position of the first user and identification information of the first user by utilizing the first characteristic parameter according to the first response information, to obtain a corresponding first user file according to the identification information of the first user and to determine a first displaying position according to the first position of the first user, and to generate a first instruction by utilizing the first user file and the first displaying position and to transmit the first instruction to the touch display unit; and the touch display unit is configured to display the first user file at the first displaying position by the touch display unit according to the first instruction.

Here, the first collection unit may comprise a microphone array, and/or fisheye lens, and/or WOFV lens. The microphone array is well known, and a microphone array may be formed by installing a plurality of microphones in the electronic device. The fisheye lens or WFOV lens is also well known. The shooting range of a fisheye lens may be 220 or 230 degrees, so all of the views surrounding the electronic device may be collected by at most two fisheye lenses.

When the first collection unit is a microphone array, the first characteristic parameter of the first user may be a sound parameter. The sound parameter may comprise a volume, a phase difference, an orientation of the sound or a voiceprint characteristic parameter.

When the first collection unit is a fisheye lens or a WFOV lens, the first characteristic parameter of the first user may comprise a facial characteristic parameter. The facial characteristic parameter may comprise a distance parameter and a facial image, or may comprise a distance parameter and an eye image, and so on.

The information processing unit is configured to determine the distance from the first user to the first collection unit according to the sound parameter or the facial characteristic parameter, judge whether the distance from the first user to the first collection unit is smaller than a specified distance, decide that the first characteristic parameter satisfies the predefined first condition if the distance is smaller than the specified distance, and decide that the first characteristic parameter does not satisfy the predefined first condition if the distance is not smaller than the specified distance.

The information processing unit is configured to utilize the volume or the phase difference of the sound parameters to calculate the distance from the first user to the first collection unit if the first parameter is a sound parameter; or to utilize the distance parameter as the distance from the first user to the first collection unit if the first characteristic parameter is a facial characteristic parameter. The technical solution of utilizing the volume or the phase difference of the sound parameters to calculate the distance from the first user to the first collection unit is well known, and its description is omitted for clarity.

Preferably, the information processing unit is configured to, if the first characteristic parameter is a sound parameter, take the orientation parameter of the sound parameter as the first position of the first user, extract a voiceprint characteristic parameter from the sound parameter and compare the voiceprint characteristic parameter with a voiceprint characteristic parameter in a stored user voiceprint characteristic table to extract identification information corresponding to the first user, wherein the user voiceprint characteristic table may comprise user identification information and a corresponding voiceprint characteristic parameter; or if the first characteristic parameter is a facial characteristic parameter, take the orientation parameter of the facial characteristic parameter as the first position of the first user, extract a facial characteristic value or an eye characteristic value from the facial characteristic parameters and compare it with a facial characteristic value or an eye characteristic value in a stored user characteristic table to extract identification information corresponding to the first user.

According to the technical solution of the embodiment of the present disclosure, it automatically selects a corresponding file for the user and displays it at an appropriate position when the user's first characteristic parameter satisfies the first condition. Consequently, it may automatically select and display a file which conforms to the user's status and position so as to provide a more convenient environment for users and to improve the user experience.

10th Embodiment

The embodiment of the present disclosure provides an electronic device which includes a first collection unit, a touch display unit and an information processing unit as shown in FIG. 13, wherein the first collection unit is configured to collect a first characteristic parameter of a first user in real time in an operating state, and to transmit the first characteristic parameter to the information processing unit; the information processing unit is configured to obtain a current first characteristic parameter of a first user collected by the first collection unit, to judge whether the first characteristic parameter satisfies a predefined first condition and to generate first response information if the first condition is satisfied, to determine a first position of the first user and identification information of the first user by utilizing the first characteristic parameter according to the first response information, to obtain a corresponding first user file according to the identification information of the first user and to determine a first displaying position according to the first position of the first user, to generate a first instruction by utilizing the first user file and the first displaying position and to transmit the first instruction to the touch display unit; and the touch display unit is configured to display the first user file at the first displaying position by the touch display unit according to the first instruction.

Here, the first collection unit may comprise a microphone array, and/or fisheye lens, and/or WOFV lens.

The microphone array is well known, and a microphone array may be formed by installing a plurality of microphones in the electronic device.

The fisheye lens or WFOV lens is also well known. The shooting range of a fisheye lens may be 220 or 230 degrees, so all of the views surrounding the electronic device may be collected by at most two fisheye lenses.

For example, as shown in FIG. 2, a fisheye lens or WFOV lens 211 is utilized to collect characteristic parameters of a surrounding user's face. The fisheye lens or WFOV lens 211 is placed at one side of the electronic device 21 and its collection range is shown in the figure. It may collect facial characteristic parameter of the user and obtain a distance and an orientation between the WFOV lens and the user.

As shown in FIG. 3, when N microphones 311 are installed an the electronic device 31 to form a microphone array, if a user makes a sound, all of the N microphones 311 collect sound waves of the sound from the user, and a volume of the user's sound, an orientation of the sound and a voiceprint characteristic parameter are determined according to the sound wave collected by the respective microphones and the direction of the sound wave. It should be noted that a position identification for the sound may be implemented according a phase difference of the sound. The microphone array utilized in the embodiment of the present disclosure is well known and will not be illustrated in detail. Preferably, as shown in FIG. 4, when the N microphones 411 in the electronic device 41 are utilized to form a microphone array, if there are a plurality of users beside the electronic device 41, the first user 41 and the second user 42 as shown in the figure, the microphone array may collect sound waves from the users respectively and classify the collected sound waves according to the voiceprint characteristic parameter to obtain characteristic parameters of the first user 41 and the second user 42. Its particular implementation is omitted for clarity.

When the first collection unit is a microphone array, the first characteristic parameter of the first user may be a sound parameter. The sound parameter may comprise a volume, a phase difference, an orientation of the sound or a voiceprint characteristic parameter.

When the first collection unit is a fisheye lens or a WFOV lens, the first characteristic parameter of the first user may comprise a facial characteristic parameter.

The information processing unit is configured to judge whether the distance from the first user to the first collection unit is smaller than a specified distance according to the sound parameter or the facial characteristic parameter; decide that the first characteristic parameter satisfies the predefined first condition if the distance is smaller than the specified distance; and decide that the first characteristic parameter does not satisfy the predefined first condition if the distance is not smaller than the specified distance.

Preferably, the information processing unit is configured to, if the first characteristic parameter is a sound parameter, take the orientation parameter of the sound parameter as the first position of the first user, extract a voiceprint characteristic parameter from the sound parameter and compare the voiceprint characteristic parameter with a voiceprint characteristic parameter in a stored user voiceprint characteristic table to extract identification information corresponding to the first user, wherein the user's voiceprint characteristic table may comprise user identification information and a corresponding voiceprint characteristic parameter; or if the first characteristic parameter is a facial characteristic parameter, take the orientation parameter of the facial characteristic parameter as the first position of the first user, extract a facial characteristic value or an eye characteristic value from the facial characteristic parameters and compare it with a facial characteristic value or an eye characteristic value in a stored user characteristic table to extract identification information corresponding to the first user.

The information processing unit is further configured to, after having received the first instruction, receive the first characteristic parameter of a first user collected by the first collection unit, to determine a second position of the first user according to the first characteristic parameter when the first characteristic parameter satisfies the first condition, to judge whether the distance from the second position to the first position satisfies a second condition and to generate second response information when the second condition is satisfied, to take the second position as the updated first position according to the second response information, to determine an updated first displaying position according to the updated first position, to generate a second instruction by utilizing the updated first displaying position and the first user file and to transmit the second instruction to the touch display unit; correspondingly, the touch display unit is further configured to display the first user file at the updated first displaying position by the touch display unit according to the second instruction.

When the first characteristic parameter is a sound parameter, the information processing unit is configured to determine a second position of the first user according to the sound orientation of the currently obtained sound parameters, determining a distance from the second position to the first position, judge whether the distance is larger than a predefined threshold value, decide that the distance from the second position to the first position satisfies the second condition and generate the second response information if the distance is larger than the predefined threshold value, and take no operation if the distance is not larger than the predefined threshold value; or when the first characteristic parameter is a facial characteristic parameter, the information processing unit is configured to take the orientation parameter of the facial characteristic parameter as the second position of the first user, determine a distance from the second position to the first position, judge whether the distance is larger than a predefined threshold value, decide that the distance from the second position to the first position satisfies the second condition and generate the second response information if the distance is larger than the predefined threshold value, and take no operation if the distance is not larger than the predefined threshold value.

The information processing unit is configured to determine an updated first position of the first user file according to the second instruction and to display the first user file at the updated first displaying position.

Preferably, the information processing unit is configured to take a displaying region and a displaying size of the first user file as the first displaying position according to the first position of the first user and a predefined size for displaying a file.

Preferably, the information processing unit is configured to determine the second position of the first user according to the first characteristic parameter, judge whether a distance from the second position to the first position satisfies the second condition, judge whether there is any processing or operating on the first user file prior to generating the second response information if the distance satisfies the second condition; if there is such processing and operating, start a timer after completing the processing or operating; if the timer is larger than a predefined overtime threshold and no new processing instruction has been received for the first user file, start to determine the second position of the first user according to first characteristic parameter; judge whether the distance from the second position to the first position satisfies the second condition; generate second response information if the distance satisfies the second condition, wherein the predefined overtime threshold of the timer can be set according to actual requirement, e.g. 5 minutes or 10 minutes.

Thus, it may avoid movement of a file which occurs when the user needs to communicate with other users in a close range and will results in an updated position of the first user file, thereby ensuring the stability for user to view or operate the files.

The information processing unit is configured to look up all of the corresponding files according to the identification information of the first user; to obtain attribute parameters for all of the files; to select a first user file from all of the files according to the attribute parameters, wherein the attribute parameters includes a file name, a last operating time for the file, times for operating the file and so on.

The information processing unit is configured to select a file which is last operated by the first user as the first user file according to the last operation times for the files in the attribute parameters; or to select a file on which the first user operates for the maximum number of times as the first user file according to number for operating file in the attribute parameters.

Thus, it may provide a file which better approaches the requirement to the user as the first user file.

The information processing unit is configured to look up all of the corresponding files according to the identification information of the first user; to obtain attribute parameters for all of the files; to generate list information for all of the files corresponding to the first user by utilizing the attribute parameter; and to take the list information for all of the files as the first user file.

Preferably, the information processing unit is configured to generate list information for all of the files corresponding to the first user by utilizing a file name in the attribute parameter for all of the files.

Preferably, after the step of taking the list information for all of the files as the first user file, the information processing unit is further configured to select a file to be operated from the list information by the user and to display the file to be operated and selected by the user at the first displaying position.

Thus, all the stored files may be presented to the user so that the user may select a desired file from all of the files.

According to the technical solution of the embodiment of the present disclosure, it automatically selects a corresponding file for the user and displays it at an appropriate position when the user's first characteristic parameter satisfies the first condition. Consequently, it may automatically select and display a file which conforms to the user's status and position so as to provide a more convenient environment for users and to improve the user experience.

Furthermore, the technical solution of the embodiment of the present disclosure may update the displaying position of the file with the change of the user's position, and display the corresponding file at the updated displaying position. Thus, when the user only views the file and does not operate the file, it is not necessary for the user to manually move the file. The file will be moved according the user's movement, so as to further improve the user experience.

11$^{th}$ Embodiment

The embodiment of the present disclosure provides an electronic device which may be a device with a large screen and includes a first collection unit, a touch display unit and an information processing unit as shown in FIG. 13, wherein the first collection unit is configured to collect a first characteristic parameter of a first user in real time in an operating state, and to transmit the first characteristic parameter to the information processing unit; the information processing unit is configured to obtain a current first characteristic parameter of a first user collected by the first collection unit; to judge whether the first characteristic parameter satisfies a predefined first condition, and to generate first response information if the first condition is satisfied; to determine a first position of the first user and identification information of the first user by utilizing the first characteristic parameter according to the first response information; to obtain a corresponding first user file according to the identification information of the first user and to determine a first displaying position according to the first position of the first user; and to generate a first instruction by utilizing the first user file and the first displaying position and to transmit the first instruction to the touch display unit; the touch display unit is configured to display the first user file at the first displaying position by the touch display unit according to the first instruction.

Here, the first collection unit may comprise a microphone array, and/or fisheye lens, and/or WOFV lens. The microphone array is well known, and a microphone array may be formed by installing a plurality of microphones in the electronic device. The fisheye lens or WFOV lens is also well known. The shooting range of a fisheye lens may be 220 or 230 degrees, so all of the views surrounding the electronic device may be collected by at most two fisheye lenses.

When the first collection unit is a microphone array, the first characteristic parameter of the first user may be a sound parameter. The sound parameter may comprise a volume, a phase difference, an orientation of the sound or a voiceprint characteristic parameter.

When the first collection unit is a fisheye lens or a WFOV lens, the first characteristic parameter of the first user may comprise a facial characteristic parameter. The facial characteristic parameter may comprise a distance parameter and a facial image, or may comprise a distance parameter and an eye image, and so on.

The information processing unit is configured to determine a distance from the first user to the first collection unit according to the sound parameter or the facial characteristic parameter, judge whether the distance from the first user to the first collection unit is smaller than a specified distance, decide that the first characteristic parameter satisfies the predefined first condition if the distance is smaller than the specified distance, and decide that the first characteristic parameter does not satisfy the predefined first condition if the distance is not smaller than the specified distance.

The information processing unit is configured to utilize the volume or the phase difference of the sound parameters to calculate the distance from the first user to the first collection unit if the first parameter is a sound parameter; or to utilize the distance parameter as the distance from the first user to the first collection unit if the first characteristic parameter is a facial characteristic parameter. The technical solution of utilizing the volume or the phase difference of the sound parameters to calculate the distance from the first user to the first collection unit is well known, and its description is omitted for clarity.

Preferably, the information processing unit is configured to, if the first characteristic parameter is a sound parameter, take the orientation parameter of the sound parameter as the first position of the first user, extract a voiceprint characteristic parameter from the sound parameter and compare the voiceprint characteristic parameter with a voiceprint characteristic parameter in a stored user voiceprint characteristic table to extract identification information corresponding to the first user, wherein the user voiceprint characteristic table may comprise user identification information and a corresponding voiceprint characteristic parameter; or if the first characteristic parameter is a facial characteristic parameter, take the orientation parameter of the facial characteristic parameter as the first position of the first user, extract a facial characteristic value or an eye characteristic value from the facial characteristic parameters and compare it with a facial characteristic value or an eye characteristic value in a stored user characteristic table to extract identification information corresponding to the first user.

Preferably, the information processing unit is configured to resolve the first characteristic parameter to obtain a first characteristic value, the first characteristic value representing first biologic characteristics of the first user; to select a file including the first biologic characteristics from all of the files as the first user file according to the first characteristic value. The first biologic characteristics may comprise facial characteristics, iris characteristics, retina characteristics, fingerprint characteristics, palm print characteristics and hand shape characteristics. The first biologic characteristics may utilize one or more of the above mentioned characteristics.

Correspondingly, the first collection unit may be implemented by a module which supports collection of biologic characteristics in a corresponding form. The touch display unit may be implemented by a display screen and a display driving circuit in the electronic device.

According to the technical solution of the embodiment of the present disclosure, it automatically selects a corresponding file for the user and displays it at an appropriate position when the user's first characteristic parameter satisfies the first condition. Consequently, it may automatically select and display a file which conforms to the user's status and position so as to provide a more convenient environment for users and to improve the user experience. The electronic device utilizes a biologic characteristic matching mechanism to determine the file corresponding to the user's first biologic characteristics from all of the files, which saves the time for the user to manually look up the file and is more applicable to a multi-user sharing scene, thereby improving the users experience.

12$^{th}$ Embodiment

Figure 14:
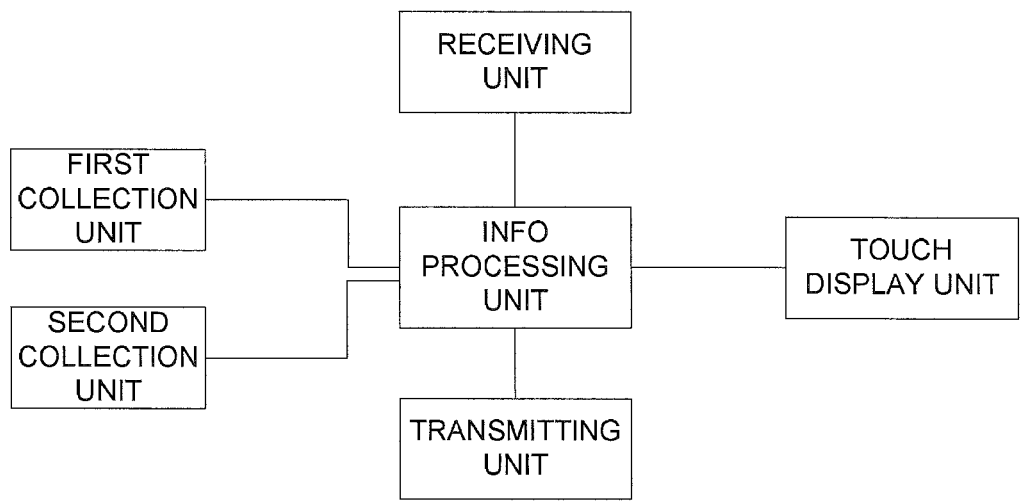
FIG. 14 is another schematic view showing the structure of the electronic device according to one embodiment of the present invention.

The embodiment of the present disclosure provides an electronic device which may be a device with a large screen and includes a first collection unit, a second collection unit, a touch display unit, an information processing unit, a receiving unit and a transmitting unit as shown in FIG. 14, wherein the first collection unit is configured to collect a first characteristic parameter of a first user in an operating state, and to transmit the first characteristic parameter to the information processing unit; the information processing unit is configured to obtain a current first characteristic parameter of a first user collected by the first collection unit; to judge whether the first characteristic parameter satisfies a predefined first condition, and to generate first response information if the first condition is satisfied; to determine a first position of the first user and identification information of the first user by utilizing the first characteristic parameter according to the first response information; to obtain a corresponding first user file according to the identification information of the first user and to determine a first displaying position according to the first position of the first user; and to generate a first instruction by utilizing the first user file and the first displaying position and to transmit the first instruction to the touch display unit; the touch display unit is configured to display the first user file at the first displaying position by the touch display unit according to the first instruction.

Here, the first collection unit may comprise a microphone array, and/or fisheye lens, and/or WOFV lens. The microphone array is well known, and a microphone array may be formed by installing a plurality of microphones in the electronic device. The fisheye lens or WFOV lens is also well known. The shooting range of a fisheye lens may be 220 or 230 degrees, so all of the views surrounding the electronic device may be collected by at most two fisheye lenses.

When the first collection unit is a microphone array, the first characteristic parameter of the first user may be a sound parameter. The sound parameter may comprise a volume, a phase difference, an orientation of the sound or a voiceprint characteristic parameter.

When the first collection unit is a fisheye lens or a WFOV lens, the first characteristic parameter of the first user may comprise a facial characteristic parameter. The facial characteristic parameter may comprise a distance parameter and a facial image, or may comprise a distance parameter and an eye image, and so on.

The information processing unit is configured to determine the distance from the first user to the first collection unit according to the sound parameter or the facial characteristic parameter, judge whether the distance from the first user to the first collection unit is smaller than a specified distance, decide that the first characteristic parameter satisfies the predefined first condition if the distance is smaller than the specified distance, and decide that the first characteristic parameter does not satisfy the predefined first condition if the distance is not smaller than the specified distance.

The information processing unit is configured to utilize the volume or the phase difference of the sound parameters to calculate the distance from the first user to the first collection unit if the first parameter is a sound parameter; or to utilize the distance parameter as the distance from the first user to the first collection unit if the first characteristic parameter is a facial characteristic parameter. The technical solution of utilizing the volume or the phase difference of the sound parameters to calculate the distance from the first user to the first collection unit is well known, and its description is omitted for clarity.

Preferably, the information processing unit is configured to, if the first characteristic parameter is a sound parameter, take the orientation parameter of the sound parameter as the first position of the first user, extract a voiceprint characteristic parameter from the sound parameter and compare the voiceprint characteristic parameter with a voiceprint characteristic parameter in a stored user voiceprint characteristic table to extract identification information corresponding to the first user, wherein the user voiceprint characteristic table may comprise user identification information and a corresponding voiceprint characteristic parameter; or if the first characteristic parameter is a facial characteristic parameter, take the orientation parameter of the facial characteristic parameter as the first position of the first user, extract a facial characteristic value or an eye characteristic value from the facial characteristic parameters and compare it with a facial characteristic value or an eye characteristic value in a stored user characteristic table to extract identification information corresponding to the first user.

As shown in the figure, the electronic device may further comprise a second collection unit for collecting a second characteristic parameter of the first user.

The information processing unit is configured to resolve the second characteristic parameter to obtain a second characteristic value, the second characteristic value representing second biologic characteristics of the user of the electronic device and being different from the first biologic characteristics, to match the second characteristic parameter with a predefined characteristic value, and to control the first collection unit to enter the operation status when the second characteristic value matches the predefined characteristic value.

The first characteristic value corresponding to the first characteristic parameter and the second characteristic value corresponding to the second characteristic parameter represent first biologic characteristics and second biologic characteristics, respectively. The first biologic characteristics and the second biologic characteristics may comprise facial characteristics, iris characteristics, retina characteristics, fingerprint characteristics, palm print characteristics and hand shape characteristics. The first biologic characteristic smay utilize one or more of the above mentioned characteristics. The second biologic characteristics may utilize one or more of the above mentioned characteristics different from that of the first biologic characteristics. For example, when the first biologic characteristics is facial characteristics, the second biologic characteristics may be fingerprint characteristics.

The information processing unit is configured to resolve each file in all of the files to get a third characteristic value of the user corresponding to each file, the third characteristic value representing first biologic characteristics of the user corresponding to each file; to determine files having the same third characteristic value in all of the files; and to determine the relationship between the third characteristic value and the files having the third characteristic value.

For example, after the electronic device obtains a plurality of pictures, the relationship between the facial characteristic value and the picture is determined by resolving a facial characteristic value of each file to obtain a plurality of different third characteristic values and determining pictures having the same third characteristic value in the pictures. The electronic device may determine the pictures corresponding to the current user based on the relationship, thereby saving the time for the user to manually search for the pictures, which is more applicable to a multi-user sharing scene and a large scale information sharing scene, thereby improving the user experience.

As shown in the figure, the electronic device may further comprise a receiving unit for receiving a first trigger operation.

The information processing is configured to resolve the first user file to obtain a fourth characteristic value in response to the first trigger operation, the fourth characteristic value representing first biologic characteristics of a plurality of other users corresponding to the first user file; configured to determine the electronic device of the plurality of other users corresponding to the fourth characteristic value according to the fourth characteristic value and the relationship between the fourth characteristic value and the electronic device; step 812 of transmitting the first user file to the determined electronic device.

As shown in the figure, the electronic device may further comprise a transmitting unit for transmitting the first user file to the determined electronic device.

The present embodiment will be illustrated with reference to a particular application. Taking a shake operation as a trigger operation, when the user needs to share pictures stored in a mobile phone which includes a specific user's picture, the user holds the mobile phone to shake along a gravity direction; if the mobile phone detects a reciprocating movement along the gravity direction, the mobile phone controls its own camera (a first collection unit) to collect a facial image (a first characteristic parameter) of the specific user, resolves the collected facial image to obtain a facial characteristic value (a first characteristic value), determines a picture (a first user file) having the facial characteristic value according to the facial characteristic value and displays the determined picture. When the user needs to send the picture currently displayed by the electronic device to all of persons in the picture, a trigger operating is carried out. In response to receiving the trigger operation, the electronic device resolves the facial characteristic values (a fourth characteristic value) for all of the persons in the picture, determines electronic devices corresponding to all of the persons in the picture according to the relationship between the fourth characteristic value and the electronic device and sends the currently displayed picture to the determined electronic devices.

In the present embodiment, the electronic device utilizes a biologic characteristic matching mechanism to determine the file corresponding to the user's first biologic characteristics from all of the files, which saves the time for the user to manually look up the file and is more applicable to a multi-user sharing scene, thereby improving the user experience. Furthermore, the electronic device supports transmission of the first user file to an electronic device corresponding to the fourth characteristics according to a fourth characteristic value of the other users related to the first user file, the operation of which is convenient.

13$^{th}$ Embodiment

The embodiment of the present disclosure provides an electronic device which includes a first collection unit, a touch display unit and an information processing unit, wherein the first collection unit is configured to collect a first characteristic parameter of a first user; the information processing unit is configured to obtain a current first characteristic parameter of a first user from the first collection unit in an operating state when the touch display unit displays the first user file at the first displaying position; to judge whether the first characteristic parameter satisfies a predefined first condition, and to generate a third instruction if the first characteristic parameter does not satisfy the predefined first condition; and to send the third instruction to the touch display unit; the touch display unit is configured to resolve the third instruction to get a third resolution result and to close the first user file according to the third resolution result.

The information processing unit is configured to start a timer, to judge whether the timer reaches a predefined threshold value, close the timer without generating a third instruction when the first characteristic parameter satisfies the predefined first condition and the timer does not reach the predefined threshold value, and generate a third instruction when it reaches the predefined threshold value.

Here, the first collection unit may comprise a microphone array, and/or fisheye lens, and/or WOFV lens. The microphone array is well known, and a microphone array may be formed by installing a plurality of microphones in the electronic device. The fisheye lens or WFOV lens is also well known. The shooting range of a fisheye lens may be 220 or 230 degrees, so all of the views surrounding the electronic device may be collected by at most two fisheye lenses.

For example, as shown in FIG. 8, a WFOV lens or a fisheye lens is utilized to collect characteristic parameters of a surrounding user's face. The WFOV lens or a fisheye lens is placed at one side of the electronic device 81 and its collection range is shown in the figure. When the distance 82 from the user to the first collection unit is not smaller than the specified range, it is decided that the first characteristic parameter does not satisfy the first condition.

Or as shown in FIG. 9, N microphones 911 are installed an the electronic device 91 to form a microphone array to collect the sound from the first user 92 in real time; when the first user 92 turns around and leaves away from the electronic device 91, the microphone array may analyze a distance, an orientation and a voiceprint characteristic parameter of the first user 92 according to the sound wave collected by the N microphones 911; and it is decided that the first characteristic value does not satisfy the predefined first condition if it is decided that the distance from the first user 92 to the electronic device is not smaller than the specified distance.

When the first collection unit is a microphone array, the first characteristic parameter of the first user may be a sound parameter. The sound parameter may comprise a volume, a phase difference, an orientation of the sound or a voiceprint characteristic parameter.

When the first collection unit is a fisheye lens or a WFOV lens, the first characteristic parameter of the first user may comprise a facial characteristic parameter. The facial characteristic parameter may comprise a distance parameter and a facial image, or may comprise a distance parameter and an eye image, and so on.

The information processing unit is configured to determine the distance from the first user to the first collection unit according to the sound parameter or the facial characteristic parameter, judge whether the distance from the first user to the first collection unit is smaller than a specified distance, decide that the first characteristic parameter satisfies the predefined first condition if the distance is smaller than the specified distance, and decide that the first characteristic parameter does not satisfy the predefined first condition if the distance is not smaller than the specified distance.

The information processing unit is configured to utilize the volume or the phase difference of the sound parameters to calculate the distance from the first user to the first collection unit if the first parameter is a sound parameter; or to utilize the distance parameter as the distance from the first user to the first collection unit if the first characteristic parameter is a facial characteristic parameter.

Preferably, the information processing unit is configured to perform subsequent operations according to the method of any one of embodiments 1 to 3 if the first characteristic parameter satisfies the predefined first condition, which is omitted herein for clarity.

Preferably, the information processing unit is configured to determine identification information of the first user according to the first characteristic parameter; to determine a corresponding first user file according to the identification information of the first user; to select the first user file from a list for all of the currently opened files and to take an instruction for closing the first user file as the third instruction.

The first user file displayed in the touch display unit may be closed according to the third instruction.

According to the technical solution of the embodiment of the present disclosure, it automatically closes corresponding files for the user if it is detected that the first characteristic parameter of the user does not satisfy the first condition when the file is displayed at the user's corresponding positions. Consequently, it may avoid a problem of forgetting closing the file when the user departs from the electronic device so as to protect the user's privacy.

Furthermore, a timer may be added to judge whether the first characteristic parameter satisfies the first condition before the third instruction is generated. Thus, when the user is a little far away from the large screen but does not exit, it avoids operations of frequently closing and opening the first file, so as to ensure the user's operation experience.

It can be appreciated from the embodiments of the present application that the disclosed device and method can be implemented in alternative ways. The device embodiments as described above are illustrative only. For example, while the units have been divided in accordance with their logical functions, other divisions are possible in practice. For example, more than one unit or element can be combined or can be integrated into another system, or some features can be ignored or omitted. In addition, the coupling, direct coupling or communicative connection between various components as shown or discussed can be an indirect coupling or communicative connection via some interface, device or unit and can be electrical, mechanical or in another form.

The units described above as separated may or may not be physically separated. The components shown as units may or may not be physical units. They can be co-located or can be distributed over a number of network elements. Depending on actual requirements, some or all of the units can be selected to achieve the object of the present invention.

Further, all the functional units in various embodiments of the present invention can be integrated within one processing unit, or each of these units can be a separate unit, or two or more units can be integrated into one unit. Such integrated unit can be implemented in hardware, possibly in combination with software functional units.

It can be appreciated by those skilled in the art that some or all of the steps in the method embodiment as described above can be implemented by hardware following instructions of a program. Such program can be stored in a computer readable storage medium and, when executed, performs the steps of the above method embodiment. The storage medium may be any of various mediums capable of storing program codes, such as a mobile storage device, a Read Only Memory (ROM), a Random Access Memory (RAM), a magnetic disk or an optical disc.

While the embodiments of the present invention have been described above, the scope of the present invention is not limited thereto. Various modifications and alternatives can be made by those skilled in the art without departing from the scope of the present disclosure. These modifications and alternatives are to be encompassed by the scope of the present invention which is only defined by the claims as attached.

What is claimed is:

1. An information processing method in an electronic device including a first sensor and a touch display, the method comprising steps of:
   obtaining, by the first sensor, a first characteristic parameter of a first user, wherein the first characteristic parameter comprises biometric information of the first user and current position information of the first user, wherein the first sensor is in an operating state to collect the first characteristic parameter of the first user in real time;
   determining, based on the current position information, a first position of the first user and determining, based on the biometric information in the first characteristic parameter, a distance from the first user to the first collection unit is smaller than a specified distance, wherein the distance is obtained according to the current position information;
   obtaining a first user file, based on the identification information of the first user, and determining a first displaying position for the touch display, based on the first position of the first user; and
   displaying, by the touch display, the first user file at the first displaying position;
   wherein the step of obtaining a first user file according to the identification information of the first user comprises steps of:
      resolving the first characteristic parameter to obtain a first biologic characteristics of the first user; and
      selecting a file including the first biologic characteristics as the first user file, and
   wherein the electronic device further comprises a second sensor, and wherein before the step of obtaining a first characteristic parameter of the first user by the first sensor, the method further comprises steps of:
   obtaining a second characteristic parameter of the first user by the second sensor;
   resolving the second characteristic parameter to obtain second biologic characteristics of the user of the electronic device and being different from the first biologic characteristics; and
   performing the step of obtaining a first characteristic parameter of a first user by the first sensor in response to that the second biologic characteristics matches predefined biologic characteristics.

2. The method of claim 1, wherein after the step of displaying, by the touch display, the first user file on the first displaying position, the method further comprises steps of:
   continuing obtaining the first characteristic parameter of the first user by the first sensor in real time;
   determining a second position of the first user according to the first characteristic parameter in response to that the first characteristic parameter satisfies the first condition;
   taking the second position as an updated first position of the first user, in response to that a distance from the second position to the first position satisfies a second condition;
   determining an updated first displaying position according to the updated first position; and displaying the first user file a-on the updated first displaying position by the touch display.

3. The method of claim 1, wherein the step of obtaining the first user file according to the identification information of the first user comprises steps of:
   looking up all of corresponding files according to the identification information of the first user;
   obtaining attribute parameters for all of the corresponding files; and
   selecting the first user file from all of the corresponding files according to the attribute parameters.

4. The method of claim 1, wherein the step of obtaining a first user file according to the identification information of the first user comprises steps of:
   looking up all of corresponding files according to the identification information of the first user;
   obtaining attribute parameters for all of the corresponding files;
   generating list information for all of the corresponding files by utilizing the attribute parameters; and
   taking the list information as the first user file.

5. The method of claim 1, wherein the step of selecting a file including the first biologic characteristics as the first user file further comprises steps of:
   resolving each file to get a characteristic value of the user corresponding to each file, the characteristic value representing the first biologic characteristics of the user corresponding to each file;
   determining files having the characteristic value; and
   determining the relationship between the characteristic value and the files having the characteristic value.

6. The method of claim 1, further comprising:
   receiving a first trigger operation;
   resolving the first user file to obtain a characteristic value in response to the first trigger operation, the characteristic value representing the first biologic characteristics of a plurality of other users corresponding to the first user file;
   determining electronic devices of the plurality of other users corresponding to the characteristic value according to the characteristic value and the relationship between the characteristic value and electronic devices; and
   transmitting the first user file to the determined electronic devices.

7. An electronic device, comprising a first sensor, a touch display and a processor, wherein
   the first sensor is configured to obtain a first characteristic parameter of a first user in an operating state, and to send the first characteristic parameter to the processor, wherein the first characteristic parameter comprises biometric information of the first user and current position information of the first user;
   the processor is configured to:
      determine, based on the current position information in the first characteristic parameter, a first position of the first user, and determine, based on the biometric information in the first characteristic parameter, identification information of the first user, in response to that the first characteristic parameter satisfies a predefined condition, wherein that the first characteristic parameter satisfies the predefined first condition comprises a distance from the first user to the first collection unit, which is obtained according to the current position information, is smaller than a specified distance;

obtain, based on the identification information of the first user, a first user file;

determine, based on the first position of the first user, a first displaying position; and the touch display is configured to display the first user file on the first displaying position, wherein the processor is further configured to:

resolve the first characteristic parameter, obtain first biologic characteristics of the first user, and select a file including the first biologic characteristics as the first user file according to the first characteristic parameter, and wherein the electronic device further comprises a second sensor configured to obtain a second characteristic parameter of the first user, wherein the processor is further configured to:

resolve the second characteristic parameter to obtain a second biologic characteristics of the first user, wherein the second biologic characteristic is different from the first biologic characteristics, and control the first sensor to enter its operating state in response to that the second biologic characteristics matches the predefined biologic characteristic.

8. The electronic device of claim 7 wherein the processor is further configured, after displaying of the first user file to determine a second position of the first user according to the first characteristic parameter in response to that the first characteristic parameter satisfies the predefined first condition, to take the second position as an updated first position in response to that the distance from the second position to the first position satisfies a second condition, to determine an updated first displaying position according to the updated first position; and the touch display is further configured to display the first user file at on the updated first displaying position.

9. The electronic device of claim 7, wherein the processor is further configured to look up all of corresponding files according to the identification information of the first user, to obtain attribute parameters for all of the corresponding files, and to select a first user file from all of the corresponding files according to the attribute parameters.

10. The electronic device of claim 7, wherein the processor is further configured to:

look up all of corresponding files according to the identification information of the first user, obtain attribute parameters for all of the corresponding files, generate list information for all of the corresponding files based on the attribute parameter, and take the list information as the first user file.

11. The electronic device of claim 7, wherein the processor is further configured to resolve each file to get a characteristic value of the user corresponding to each file, the characteristic value representing the first biologic characteristics of the user corresponding to each file, to determine files having the characteristic value, and to determine a relationship between the characteristic value and the files having the characteristic value.

12. The electronic device of claim 7, wherein the electronic device further comprises a receiver configured to receive a first trigger operation;

wherein the processor is further configured to:

resolve the first user file to obtain a characteristic value in response to the first trigger operation, the characteristic value representing the first biologic characteristics of a plurality of other users corresponding to the first user file, and determine electronic devices of the plurality of other users corresponding to the fourth characteristic value according to the characteristic value and the relationship between the characteristic value and electronic devices; and wherein the electronic device further comprises a transmitter being configured to transmit the first user file to the determined electronic devices.

* * * * *